(12) United States Patent
Sugiue et al.

(10) Patent No.: US 11,457,700 B2
(45) Date of Patent: Oct. 4, 2022

(54) DECORATIVE APPARATUS, DRIVE CONTROL METHOD, AND COMMUNICATION SYSTEM

(71) Applicant: SONY CORPORATION, Tokyo (JP)

(72) Inventors: Yuki Sugiue, Tokyo (JP); Makoto Akagi, Kanagawa (JP); Kenji Itoh, Tokyo (JP); Yoichi Ito, Kanagawa (JP); Machiko Takematsu, Kanagawa (JP); Masakazu Mitsugi, Kanagawa (JP); Masaki Miyamoto, Tokyo (JP); Masaaki Yamamoto, Chiba (JP); Seigo Yoneda, Chiba (JP)

(73) Assignee: SONY CORPORATION, Tokyo (JP)

( * ) Notice: Subject to any disclaimer, the term of this patent is extended or adjusted under 35 U.S.C. 154(b) by 986 days.

(21) Appl. No.: 16/304,190

(22) PCT Filed: Jun. 9, 2017

(86) PCT No.: PCT/JP2017/021445
§ 371 (c)(1),
(2) Date: Nov. 23, 2018

(87) PCT Pub. No.: WO2017/221740
PCT Pub. Date: Dec. 28, 2017

(65) Prior Publication Data
US 2020/0320920 A1     Oct. 8, 2020

(30) Foreign Application Priority Data
Jun. 23, 2016 (JP) .............................. JP2016-124614

(51) Int. Cl.
*A61B 5/16* (2006.01)
*A44C 5/00* (2006.01)
(Continued)

(52) U.S. Cl.
CPC ................ *A44C 5/00* (2013.01); *A44C 25/00* (2013.01); *G02F 1/167* (2013.01); *G02F 1/1677* (2019.01);
(Continued)

(58) Field of Classification Search
USPC ......................................................... 340/902
See application file for complete search history.

(56) References Cited

U.S. PATENT DOCUMENTS

2015/0077438 A1* 3/2015 Tamaki ............... H01L 51/5012
345/672
2017/0038827 A1* 2/2017 Wang .................... G06F 1/1652
(Continued)

FOREIGN PATENT DOCUMENTS

JP        S53-126297 A    11/1978
JP        3096593 U        9/2003
(Continued)

*Primary Examiner* — Brent Swarthout
(74) *Attorney, Agent, or Firm* — Paratus Law Group, PLLC

(57) ABSTRACT

There is provided a decorative apparatus, a drive control method, and a communication system that can provide a new way of enjoyment using a thin display. The decorative apparatus includes a thin-plate display arranged between a stone and a stone seat, and a drive control unit that controls display on the display. The present technology can be applied to accessories (jewelry) such as rings, pendants, necklaces, earrings, and the like, for example.

18 Claims, 19 Drawing Sheets

(51) Int. Cl.
  *G02F 1/167* (2019.01)
  *G02F 1/16753* (2019.01)
  *G02F 1/1677* (2019.01)
  *H04W 4/80* (2018.01)
  *A44C 25/00* (2006.01)
  *G09G 3/20* (2006.01)
(52) U.S. Cl.
  CPC ....... *G02F 1/16753* (2019.01); *G09G 3/2003* (2013.01); *H04W 4/80* (2018.02)

(56) References Cited

U.S. PATENT DOCUMENTS

2017/0243385 A1* 8/2017 Mitsugi .................... G09F 9/372
2018/0213897 A1* 8/2018 Yun ........................... B44C 1/00

FOREIGN PATENT DOCUMENTS

| | | |
|---|---|---|
| JP | 2006-200909 A | 8/2006 |
| JP | 2011-019023 A | 1/2011 |
| JP | 2013-015779 A | 1/2013 |

* cited by examiner

FIG. 13
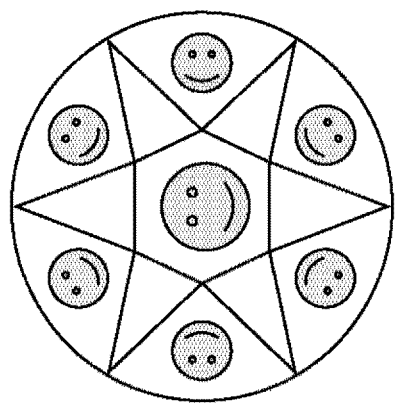
B
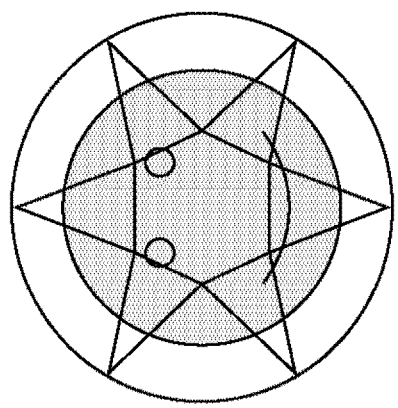
A

DECORATIVE APPARATUS, DRIVE CONTROL METHOD, AND COMMUNICATION SYSTEM

CROSS REFERENCE TO PRIOR APPLICATION

This application is a National Stage Patent Application of PCT International Patent Application No. PCT/JP2017/021445 (filed on Jun. 9, 2017) under 35 U.S.C. § 371, which claims priority to Japanese Patent Application No. 2016-124614 (filed on Jun. 23, 2016), which are all hereby incorporated by reference in their entirety.

TECHNICAL FIELD

The present technology relates to a decorative apparatus, a drive control method, and a communication system, and in particular to a decorative apparatus, a drive control method, and a communication system that can provide a new way of enjoyment using a thin display.

BACKGROUND ART

Examples of thin displays include liquid crystal displays, organic EL displays, electronic paper, and the like. Electronic paper requires a flow of current only when switching the display, and does not require a flow of current in order to keep the display. Therefore, electric paper is excellent in low power consumption. Electronic paper is utilized for tablet display apparatuses such as electronic book readers (see, for example, Patent Document 1).

CITATION LIST

Patent Document

Patent Document 1: Japanese Patent Application Laid-Open No. 2013-15779

SUMMARY OF THE INVENTION

Problems to be Solved by the Invention

In recent years, the application of such thin displays to various products has been desired.

The present technology has been made in view of such a situation, and an object thereof is to provide a new way of enjoyment using a thin display.

Solutions to Problems

A decorative apparatus according to a first aspect of the present technology includes: a thin-plate display arranged between a stone and a stone seat; and a drive control unit that controls display on the display.

A drive control method according to a second aspect of the present technology is for a decorative apparatus including: a thin-plate display arranged between a stone and a stone seat; and a drive control unit that drives the display, and the drive control unit controls display on the display.

According to the first and second aspects of the present technology, display on the thin-plate display arranged between the stone and the stone seat of the decorative apparatus is controlled.

A communication system according to a third aspect of the present technology includes a decorative apparatus and a terminal apparatus, the decorative apparatus includes: a thin-plate display arranged between a stone and a stone seat; a drive control unit that controls display on the display; and a communication unit that performs wireless communication with the terminal apparatus, and the terminal apparatus transmits control information for changing display on the display to the communication unit.

According to the third aspect of the present technology, control information for changing display on the display is transmitted from the terminal apparatus to the decorative apparatus, and display on the thin-plate display arranged between the stone and the stone seat of the decorative apparatus is changed.

The decorative apparatus may be an independent apparatus or an internal block constituting one apparatus.

Effects of the Invention

According to the first to third aspects of the present technology, a new way of enjoyment can be provided using a thin display.

Note that the effects described herein are not necessarily limited, and any of the effects described in the present disclosure may be obtained.

BRIEF DESCRIPTION OF DRAWINGS

FIG. 13 is a diagram illustrating examples of displaying created display patterns.

MODE FOR CARRYING OUT THE INVENTION

Hereinafter, modes for carrying out the present technology (hereinafter referred to as "embodiments") will be described. Note that the description will be provided in the following order.

1. Schematic Configuration Example of First Embodiment of Decorative Article
2. Control Block Diagram of Decorative Article
3. Explanation of Operation in Manual Mode
4. Explanation of Operation in Auto Modes
5. Schematic Configuration Example of Second Embodiment of Decorative Article
6. Schematic Configuration Example of Third Embodiment of Decorative Article
7. Fourth Embodiment of Decorative Article
8. Other Application Examples of Decorative Articles 1. Schematic Configuration Example of First Embodiment of Decorative Article FIG. 1 is a cross-sectional diagram illustrating a schematic configuration example of a first embodiment of a decorative article.

Figure 1:
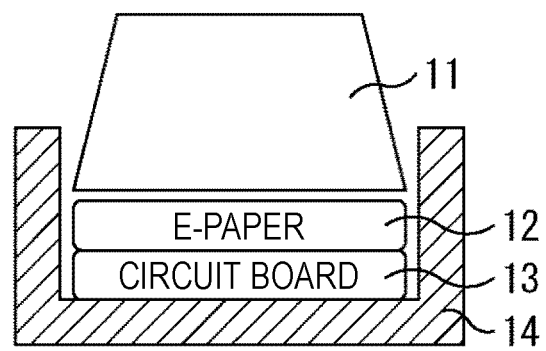
FIG. 1 is a cross-sectional diagram illustrating a schematic configuration example of a first embodiment of a decorative article.

The decorative article 1 illustrated in FIG. 1 has a stone 11, e-paper 12, a circuit board 13, and a stone seat 14. This decorative article 1 is used for accessories (jewelry) such as rings, pendants, necklaces, and earrings, for example.

The stone 11 includes, for example, natural stone such as diamond and ruby or artificial stone such as plastic and glass. In the present embodiment, the stone 11 is colorless and transparent for ease of explanation, but the stone 11 itself may have a certain color. The cut shape of the stone 11 can be freely selected from among various shapes, such as what is called brilliant cut, for example.

The e-paper 12 is what is called electronic paper, i.e., a thin-plate electrophoretic display which can be flexibly deformed.

Below is a brief description of the structure of the electrophoretic display.

For example, the structure of the electrophoretic display includes a microcapsule-packed layer sandwiched between electrode layers. The electrode layer visible to a user includes a transparent electrode layer such as indium tin oxide (ITO) and ZnO.

The microcapsule-packed layer includes a transparent solution filled with microcapsules containing one or more types of particles. For example, in a case where the microcapsules of the microcapsule-packed layer are filled with two types of particles: white particles and black particles, when a positive voltage is applied to the transparent electrode layer on the display surface side, negatively-charged white particles gather at the transparent electrode layer, and white (color) is displayed. Conversely, when a negative voltage is applied to the transparent electrode layer on the display surface side, positively-charged black particles gather at the transparent electrode layer, and black (color) is displayed. In this manner, white or black can be displayed on the electrophoretic display by controlling the voltage applied to the electrode layer. Furthermore, setting a plurality of stages of applied voltage enables intermediate gradation display between white and black (gray display).

Note that, in recent years, electrophoretic displays with microcapsules containing particles of colors other than white and black have also been developed. For example, in a case where red particles are contained, red display and intermediate gradation display (pink) between red and white are enabled as well as black display, white display, and gray display.

The present embodiment is based on the assumption that white particles, black particles, and red particles are contained in the microcapsules of the e-paper 12, enabling black display, white display, red display, and intermediate gradation display between them (gray and pink).

A feature of the electrophoretic display is low power consumption. In other words, the electrophoretic display does not require a backlight, which is necessary for a liquid crystal display (LCD). Furthermore, the electrophoretic display requires a flow of current only when switching the display, and does not require a flow of current in order to keep the display. Therefore, the electrophoretic display can operate with extremely low power consumption as compared with the LCD or the like.

Furthermore, another feature of the electrophoretic display is flexibility. In other words, the electrophoretic display has an extremely thin film shape and can be deformed freely to some extent.

Note that the electrophoretic display is not limited to the microcapsule type described above. Moreover, other known types of electronic paper may be employed, instead of the electrophoretic display.

The circuit board 13 is a board provided with a control circuit for controlling the display on the e-paper 12.

The stone seat 14 is a component for fixing the stone 11, and includes, for example, metal such as gold, silver, copper, and platinum, resin, or the like. Note that in the cross-sectional diagram of FIG. 1, the stone seat 14 is formed so as to cover all of the outer peripheral side surface and the bottom surface of the stone 11. However, the stone seat 14 may have four or eight claws such that the stone 11 is fixed only at a plurality of portions, or may not cover the bottom surface of the stone 11. In other words, the shape of the stone seat 14 is not limited, and any shape can be employed.

As illustrated in FIG. 1, the e-paper 12 is arranged between the stone 11 and the stone seat 14, and a certain color or decoration displayed by the e-paper 12 passes through the stone 11 to be recognized by the user seeing the decorative article 1.

Generally, stones of accessories such as rings, necklaces, and earrings have a great variety of colors. However, since the inherent color of a stone itself is used as the color of the stone, it is necessary to replace the accessory itself in order to change the color. For example, the user has to use different accessories of different colors according to the mood and clothes of the day.

On the other hand, according to the decorative article 1 to which the present technology is applied, the e-paper 12 is provided between the stone 11 and the stone seat 14, and the color or decoration displayed on the e-paper 12 is changed, whereby the color or decoration of the stone 11 seen by the user can be changed without replacing the stone 11. For example, when the e-paper 12 displays white (color), the user can visually recognize that color as the inherent color of the stone 11. Further, for example, when the e-paper 12 displays black (color), the user can visually recognize the stone 11 as a black stone. When the e-paper 12 displays red (color), the user can visually recognize the stone 11 as a red stone.

Note that in order to reflect the color or decoration displayed by the e-paper 12 on the stone 11, it is necessary to provide the e-paper 12 between the stone 11 and the stone seat 14. However, the circuit board 13 need not necessarily be provided between the stone 11 and the stone seat 14, and may be arranged at any place. For example, the circuit board 13 may be embedded in the central portion of the bottom surface of the stone seat 14.

Figure 2:
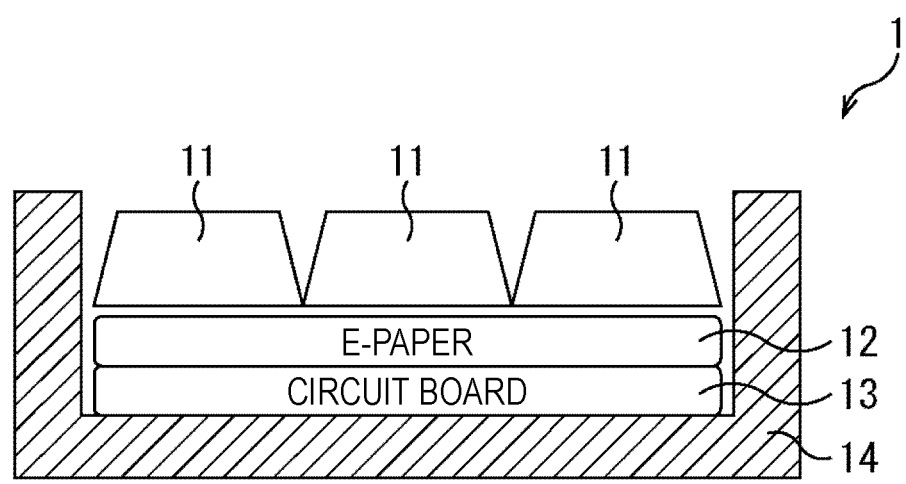
FIG. 2 is a cross-sectional diagram illustrating a schematic configuration example of the first embodiment of the decorative article.

Furthermore, the present embodiment is based on the configuration in which one stone 11 is placed on the e-paper 12 and the stone seat 14 as illustrated in FIG. 1. However, as illustrated in FIG. 2, a multi-stone configuration may be employed in which a plurality of stones 11 is placed on the e-paper 12 and the stone seat 14.

2. Control Block Diagram of Decorative Article

Figure 3:
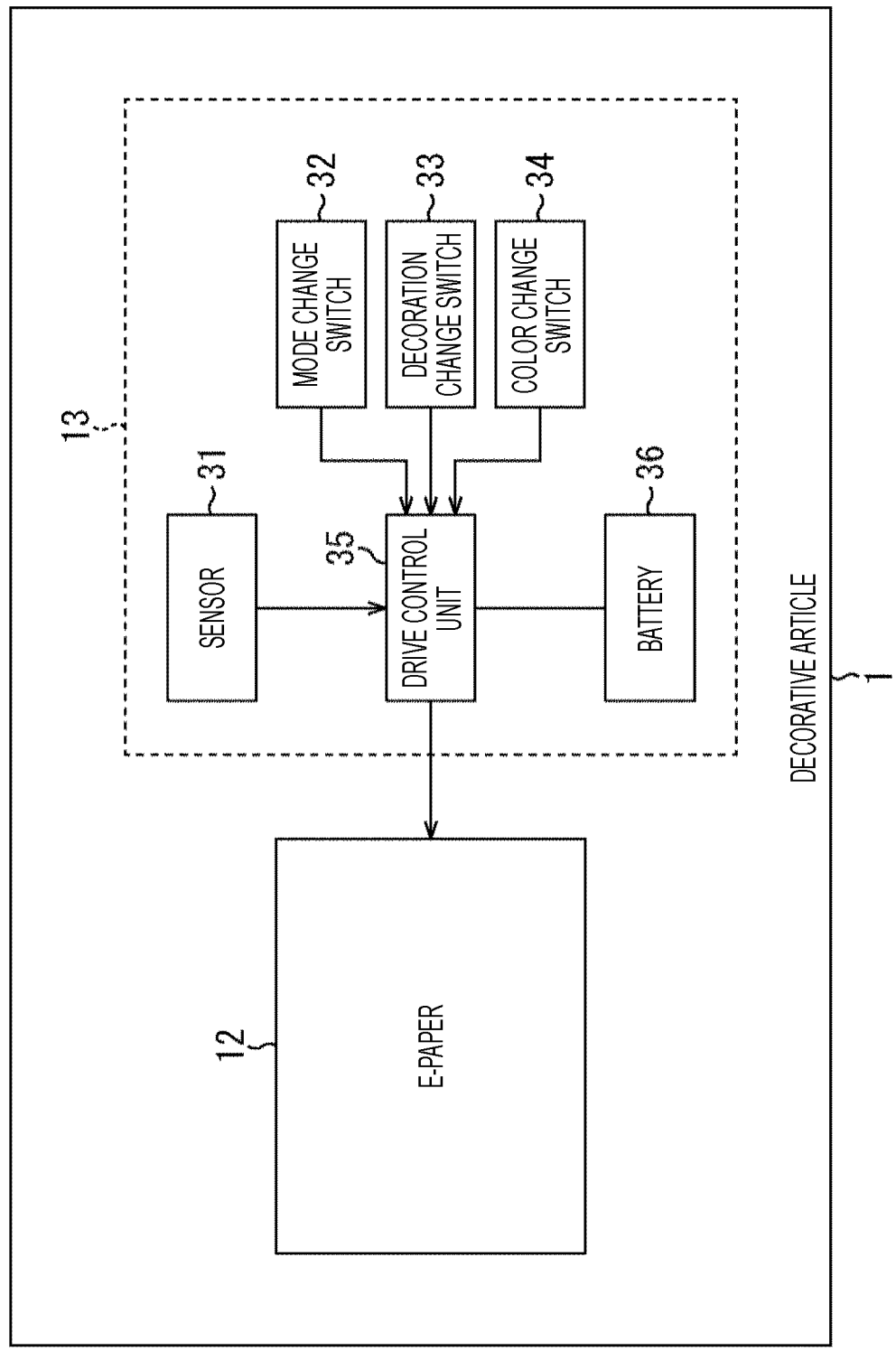
FIG. 3 is a control block diagram of the decorative article relating to display control of e-paper.

FIG. 3 is a control block diagram of the decorative article 1 relating to display control of the e-paper 12.

The decorative article 1 includes, in the circuit board 13, a sensor 31, a mode change switch 32, a decoration change switch 33, a color change switch 34, a drive control unit 35, and a battery 36.

The sensor 31 includes, for example, an acceleration sensor that detects accelerations in three axes, i.e., the X, Y, and Z axes, and supplies the detection result to the drive control unit 35. The drive control unit 35 can control the display in accordance with the output value of the sensor 31, for example, to change the color or decoration of the e-paper 12 according to the movement of the decorative article 1. Note that a gyro sensor that detects angular velocity instead of acceleration may be used.

Alternatively, the sensor 31 may include an illuminance sensor that detects the brightness of the surroundings. In this case, the drive control unit 35 can control the display in accordance with the output value of the sensor 31, for example, to change the color or decoration of the e-paper 12 according to the brightness around the decorative article 1.

Alternatively, the sensor 31 may include a biological sensor such as a heartbeat sensor that measures a heartbeat (pulse). In this case, the drive control unit 35 can control the display in accordance with the output value of the sensor 31, for example, to change the color or decoration of the e-paper 12 according to how fast or slow the heartbeat is.

Alternatively, the sensor 31 may include a global positioning system (GPS) sensor that detects the current position. In this case, the drive control unit 35 can control the display in accordance with the output value of the sensor 31, for example, to change the color or decoration of the e-paper 12 according to the current location of the user.

Alternatively, the sensor 31 may include an altitude sensor that detects altitude (elevation). In this case, the drive control unit 35 can control the display in accordance with the output value of the sensor 31, for example, to change the color or decoration of the e-paper 12 according to the change in altitude.

Alternatively, the sensor 31 may include an atmospheric pressure sensor that detects the atmospheric pressure. In this case, the drive control unit 35 can control the display in accordance with the output value of the sensor 31, for example, to change the color or decoration of the e-paper 12 according to the change in atmospheric pressure.

Alternatively, the sensor 31 may include a human sensor that detects the presence or absence of a human being. In this case, the drive control unit 35 can control the display in accordance with the output value of the sensor 31, for example, to change the color or decoration of the e-paper 12 according to the presence or absence of a person.

Alternatively, the sensor 31 may include a geomagnetic sensor that detects a bearing. In this case, the drive control unit 35 can control the display in accordance with the output value of the sensor 31, for example, to change the color or decoration of the e-paper 12 according to the change in bearing.

As described above, the sensor 31 can be any of an acceleration sensor, an illuminance sensor, a heartbeat sensor, a GPS sensor, an altitude sensor, an atmospheric pressure sensor, a human sensor, and a geomagnetic sensor. Alternatively, the circuit board 13 may be provided with a plurality of sensors 31 of any of the types described above.

The mode change switch 32 detects the user's operation for switching between a first auto mode which is a first operation mode, a second auto mode which is a second operation mode, and a manual mode which is a third operation mode, and supplies a switching control signal for switching the operation mode to the drive control unit 35 as its operation signal.

The first auto mode and the second auto mode are modes in which the drive control unit 35 automatically determines and controls the display pattern of the e-paper 12 irrespective of the operation input by the user. Here, the display pattern represents the color or decoration (motif) of the entire display region of the e-paper 12, which is expressed by a certain display on the e-paper 12. Therefore, in the present embodiment, changing the display pattern of the e-paper 12 means changing one or both of the display decoration and the display color of the e-paper 12.

In the first audo mode, the drive control unit 35 determines the drive voltage of the e-paper 12 according to the output value of the sensor 31, and supplies the determined drive voltage to the e-paper 12 to cause the e-paper 12 to display a certain display pattern.

In the second audo mode, the drive control unit 35 switches the display between a plurality of display patterns at regular time intervals. Thus, for example, in a case where the second auto mode is set, the display pattern of the e-paper 12 can be switched by day of the week or time. The display patterns that can be displayed in the second audo mode are display patterns that can be displayed using the decoration change switch 33 or the color change switch 34 in the manual mode.

The manual mode is a mode in which the decoration change switch 33 or the color change switch 34 is operated so that the e-paper 12 is controlled to display a display pattern selected by the user from among a plurality of types of display patterns determined in advance. In other words, the manual mode is a mode in which the user can select the display pattern of the e-paper 12.

The decoration change switch 33 accepts a switching operation by the user for switching the display decoration, and supplies an operation signal corresponding to the accepted switching operation to the drive control unit 35. The color change switch 34 accepts a switching operation by the user for switching the display color, and supplies an operation signal corresponding to the accepted switching operation to the drive control unit 35. The decoration change switch 33 and the color change switch 34 may be provided as one switch having both functions.

Each of the mode change switch 32, the decoration change switch 33, and the color change switch 34 includes, for example, a button switch, a slide switch, a push switch, a lever switch, a dial switch, a touch sensor, or the like.

The drive control unit 35 controls the display on the e-paper 12 by controlling the drive voltage of the e-paper 12 as a display unit. More specifically, in a case where the operation mode is set to the manual mode, the drive control unit 35 controls the display pattern of the e-paper 12 according to the operation for the decoration change switch 33 or the color change switch 34. On the other hand, in a case where the operation mode is set to the first auto mode, the drive control unit 35 controls the display pattern of the e-paper 12 on the basis of the output value of the sensor 31. In a case where the operation mode is set to the second auto mode, the drive control unit 35 controls the display pattern of the e-paper 12 according to the lapse of time.

The drive control unit 35 can be realized by executing driver software that drives the e-paper 12 using, for example, a microcomputer, a CPU, or the like.

The e-paper 12 displays a certain item (emits light) under the control of the drive control unit 35. As described above, the e-paper 12 is what is called electronic paper, i.e., a thin-plate electrophoretic display which can be flexibly deformed.

Note that there are two types of electronic paper: segment electronic paper and dot matrix electronic paper. The display region of segment electronic paper is divided into a plurality of segments in advance, and the drive voltage is controlled on a segment basis to display a certain display pattern in the entire display region. The display region of dot matrix electronic paper is equally divided into two-dimensional arrays using dot regions (micro regions), and each of the divided dot regions is individually subjected to on/off control by a thin film transistor (TFT). In the present embodiment, the e-paper 12 is dot matrix electronic paper. The display color of dot matrix electronic paper can be controlled on a dot-region basis, so that a desired display pattern can be expressed.

The battery 36 supplies power to each part of the decorative article 1.

The decorative article 1 is configured as described above.

3. Explanation of Operation in Manual Mode

Next, the operation for the case where the operation mode of the decorative article 1 is set to the manual mode will be described.

Figure 4:
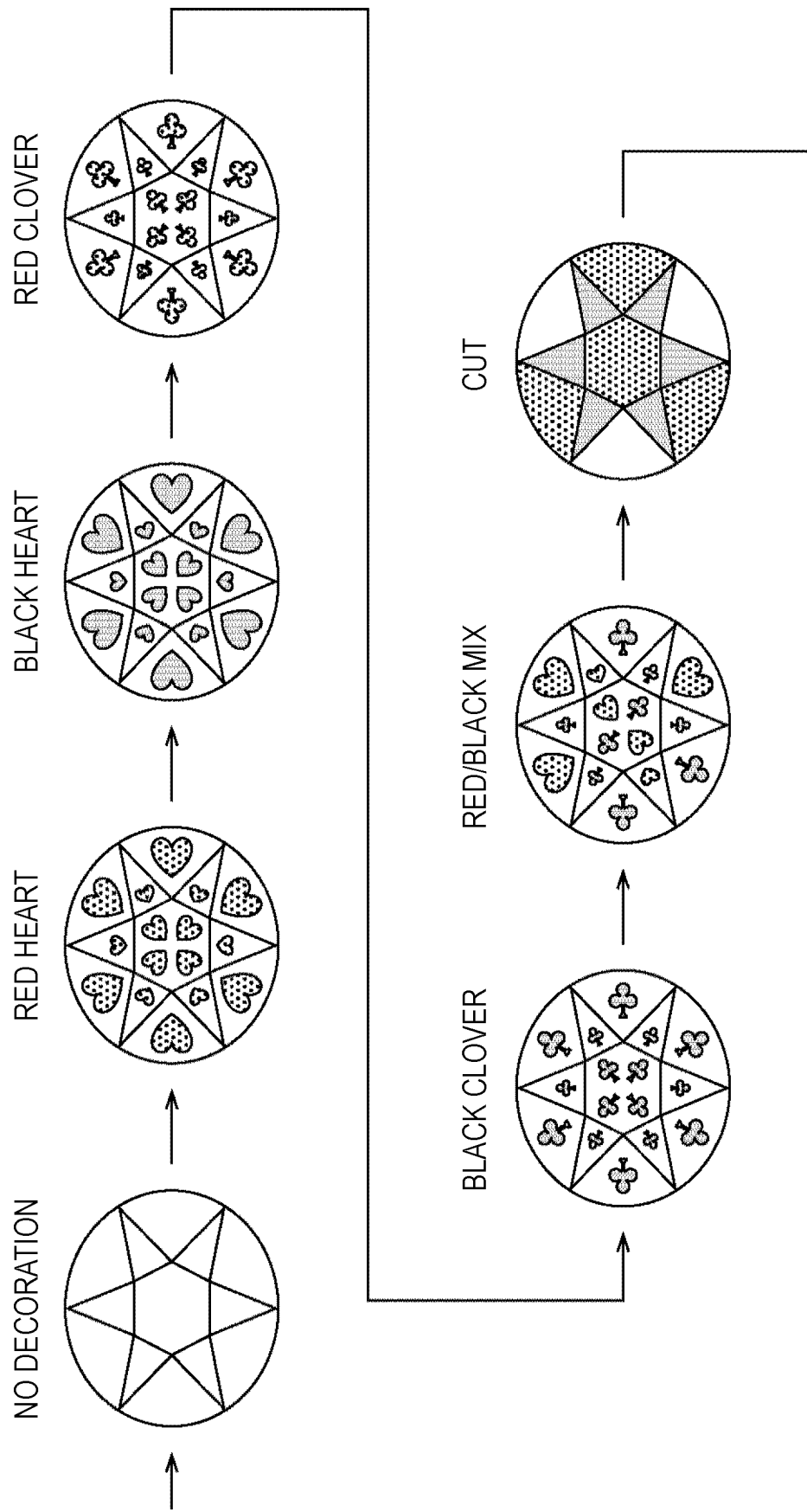
FIG. 4 is a diagram for explaining the operation performed by pressing a decoration change switch.

FIG. 4 illustrates examples of display patterns of the e-paper 12 for the case where the decoration change switch 33 is pressed by the user while the operation mode of the decorative article 1 is set to the manual mode.

When the operation mode of the decorative article 1 is changed to the manual mode, a certain pattern determined in advance, e.g., display pattern "no decoration" in FIG. 4, is displayed first. "No decoration" is a display pattern in which the entire region of the e-paper 12 is controlled to be white. The outermost circle of the display pattern "no decoration" illustrated in FIG. 4 coincides with the outline of the stone 11 in the planar direction, and its inner hexagon and six triangles represent ridge lines associated with the cut shape of the stone 11.

As illustrated in FIG. 4, each time the decoration change switch 33 is pressed by the user, the drive control unit 35 switches the display pattern from the first "no decoration" display pattern to "red heart", "black heart", "red clover", "black clover", "red/black mix", "cut", and "no decoration". "Red heart" is a display pattern in which a plurality of red heart shapes is arranged according to the cut shape of the stone 11. "Black heart" is a display pattern in which a plurality of black heart shapes is arranged according to the cut shape of the stone 11. "Red clover" is a display pattern in which a plurality of red clover shapes is arranged according to the cut shape of the stone 11. "Black clover" is a display pattern in which a plurality of black clover shapes is arranged according to the cut shape of the stone 11. "Red/black mix" is a display pattern in which a plurality of black clover shapes and red heart shapes is arranged according to the cut shape of the stone 11. "Cut" is a display pattern in which the stone 11 is divided into some regions according to the cut shape of the stone 11 and each of the divided regions is set to white, black, or red.

Figure 5:
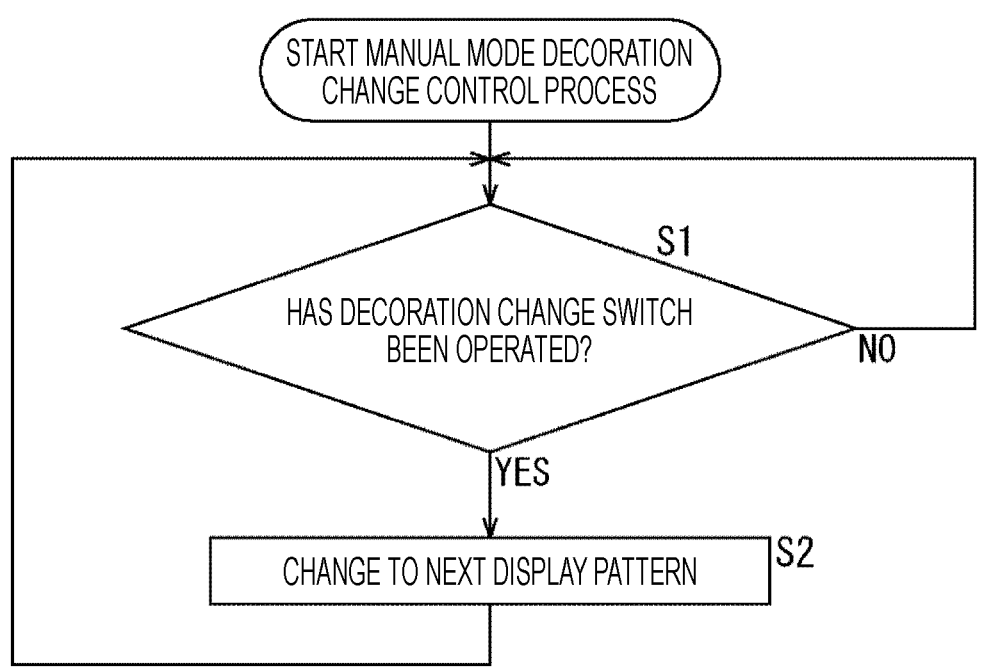
FIG. 5 is a flowchart illustrating a manual mode decoration change control process.

Next, a manual mode decoration change control process, which is a display control process for the case where the decoration change switch 33 is pressed while the operation mode is set to the manual mode, will be described with reference to the flowchart of FIG. 5. The manual mode decoration change control process of FIG. 5 is started, for example, when the operation mode is set to the manual mode by the mode change switch 32.

First, in step S1, the drive control unit 35 determines whether the decoration change switch 33 has been operated by the user. Then, the process in step S1 is repeated until it is determined that the decoration change switch 33 has been operated.

In a case where it is determined in step S1 that the decoration change switch 33 has been operated, the process proceeds to step S2, and the drive control unit 35 refers to a control table stored in an internal memory to change the display pattern of the e-paper 12 to the next display pattern. The control table stores the display order of the display patterns illustrated in FIG. 4 and the drive voltage of each dot region for displaying each display pattern.

For example, in a case where it is determined in step S1 that the decoration change switch 33 has been operated, and the current display pattern is "red heart", the drive control unit 35 changes the display pattern of the e-paper 12 to the next display pattern "black heart".

For example, in a case where it is determined in step S1 that the decoration change switch 33 has been operated, and the current display pattern is "cut", the drive control unit 35 changes the display pattern of the e-paper 12 to the next display pattern "no decoration".

Note that the types of display patterns are not limited to the seven types illustrated in FIG. 4, and a control table can be prepared so that more display patterns can be displayed. If the number of types of display patterns is seven as described above, it is possible to return to the first display pattern through seven operations. However, in a case where there are many types of display patterns, a large number of operations are required for returning to the first display pattern. Therefore, for example, the drive control unit 35 performs control to display the first display pattern in response to detecting a certain operation such as long press operation for the decoration change switch 33.

After the display pattern of the e-paper 12 is changed to the next display pattern in step S2 of FIG. 5, the process returns to step S1, and the above steps S1 and S2 are repeated until the operation mode is changed to the first auto mode or the second auto mode.

As described above, in a case where the operation mode is set to the manual mode, the display decoration of the e-paper 12 is changed according to the operation for the decoration change switch 33.

Figure 6:
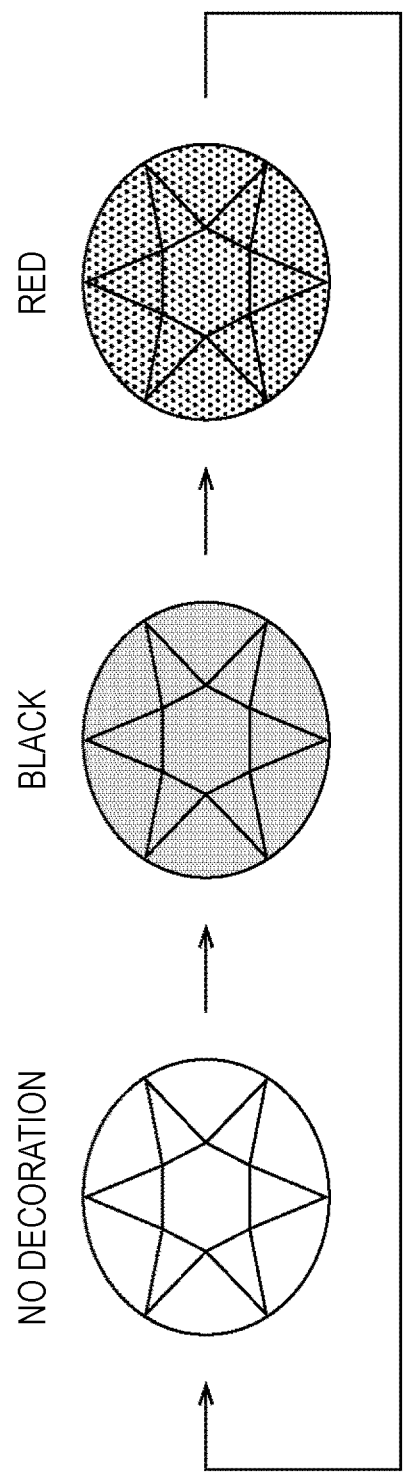
FIG. 6 is a diagram for explaining the operation performed by pressing a color change switch.

FIG. 6 illustrates examples of display patterns of the e-paper 12 for the case where the color change switch 34 is pressed by the user while the operation mode of the decorative article 1 is set to the manual mode.

When the operation mode of the decorative article 1 is changed to the manual mode, a certain pattern determined in advance, e.g., display pattern "no decoration" in FIG. 6, is displayed first.

Then, as illustrated in FIG. 6, each time the user presses the color change switch 34, the drive control unit 35 switches the display pattern to "no decoration", "black", and "red" in a predetermined order. "Black" is a display pattern in which the entire region of the e-paper 12 is controlled to be black. "Red" is a display pattern in which the entire region of the e-paper 12 is controlled to be red.

For explaining a manual mode color change control process executed when the user presses the color change switch 34 with reference to the flowchart of FIG. 5, the process of determining whether or not the decoration change switch 33 has been operated in step S1 is replaced with the process of determining whether or not the color change switch 34 has been operated.

Then, in a case where it is determined in step S1 that the color change switch 34 has been operated, the process proceeds to step S2, and the drive control unit 35 refers to a control table stored in an internal memory to change the display pattern of the e-paper 12 to the next display pattern. For example, in a case where the current display pattern is "no decoration", the drive control unit 35 changes the display pattern of the e-paper 12 to the next display pattern "black".

As described above, in a case where the operation mode is set to the manual mode, the display color of the e-paper 12 is changed according to the operation for the color change switch 34.

Note that the case where the decoration change switch 33 is operated and the case where the color change switch 34 is operated have been separately described above for ease of explanation. However, the color change switch 34 may be operated to change the display color to a certain display color while the e-paper 12 displays a certain display decoration, and vice versa.

4. Explanation of Operation in Auto Modes

Next, the operation for the case where the operation mode of the decorative article 1 is set to the auto modes will be described.

Figure 7:
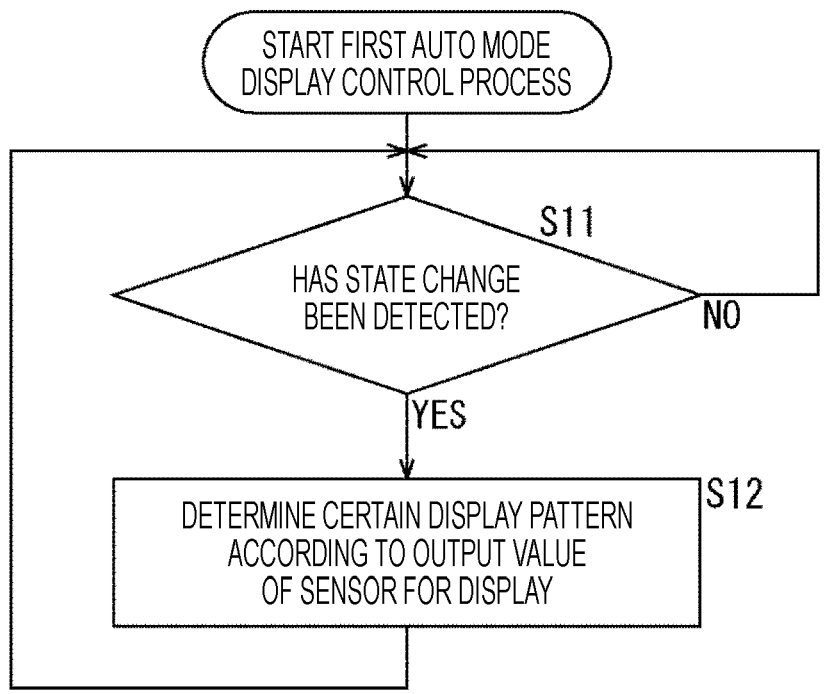
FIG. 7 is a flowchart illustrating a first auto mode display control process.

A first auto mode display control process for the case where the operation mode is set to the first auto mode will be described with reference to the flowchart of FIG. 7. The first auto mode display control process of FIG. 7 is started, for example, when the operation mode is set to the first auto mode by the mode change switch 32.

First, in step S11, the drive control unit 35 determines whether a state change of the decorative article 1 has been detected on the basis of a sensor signal output from the sensor 31. Then, the process in step S11 is repeated until it is determined that a state change of the decorative article 1 has been detected.

For example, in a case where the sensor 31 includes an acceleration sensor, the acceleration detected by the sensor 31 changes in accordance with the movement of the user. In a case where the change in the acceleration output from the sensor 31 is equal to or greater than a certain value, a state change of the decorative article 1 is detected.

Further, for example, in a case where the sensor 31 includes an illuminance sensor, the illuminance detected by the sensor 31 changes in accordance with the movement of the user. In a case where the change in the illuminance output from the sensor 31 is equal to or greater than a certain value, a state change of the decorative article 1 is detected.

In a case where it is determined in step S11 that a state change of the decorative article 1 has been detected, the process proceeds to step S12, and the drive control unit 35 determines the certain display pattern according to the output value of the sensor 31 for display on the e-paper 12.

In the first auto mode, for example, which of a plurality of display patterns in the control table is selected is determined in advance in accordance with the output value of the sensor 31.

For example, in a case where the sensor 31 includes an acceleration sensor, if the X axis exhibits the largest acceleration of the X, Y, and Z axes, the display pattern "red heart" is selected. In a case where the Y axis exhibits the largest acceleration, the display pattern "black heart" is selected. In a case where the Z axis exhibits the largest acceleration, the display pattern "red/black mix" is selected.

After the display pattern of the e-paper 12 is changed to a certain display pattern in step S12, the process returns to step S11, and the above steps S11 and S12 are repeated until the operation mode is changed to the manual mode or the second auto mode.

As described above, in a case where the operation mode is set to the first auto mode, the display pattern of the e-paper 12 is automatically changed according to the output value of the sensor 31.

A second auto mode display control process for the case where the operation mode is set to the second auto mode is not illustrated in a flowchart. For example, whether or not a certain period such as one hour and one day has elapsed is counted by an internal clock timer or the like, and in a case where it is determined that a certain period has elapsed, the drive control unit 35 selects a certain display pattern from among a plurality of display patterns in a control table for display on the e-paper 12.

As described above, in a case where the operation mode is set to the first or second auto mode, the display pattern of the e-paper 12 is automatically changed.

Figure 8:
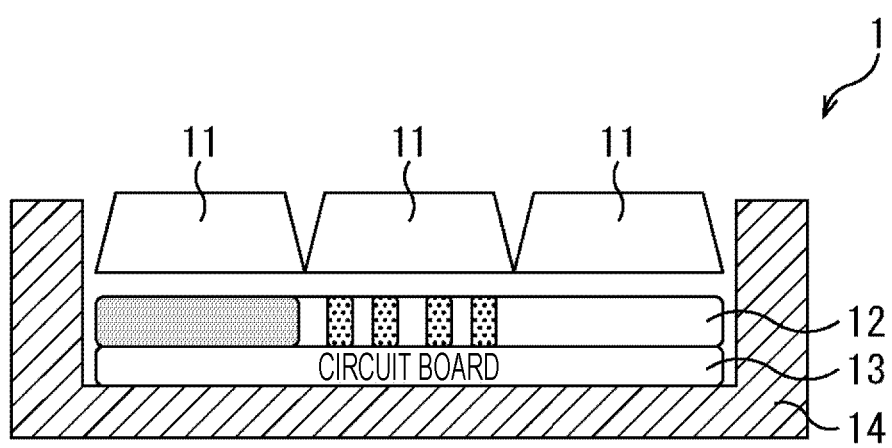
FIG. 8 is a diagram illustrating an example of display control of a multi-stone decorative article.

Note that the above examples are based on the premise that the decorative article 1 according to the first embodiment has the configuration of FIG. 1 in which one stone 11 is placed on the e-paper 12 and the stone seat 14. However, the above examples are similarly applied to the multi-stone configuration of FIG. 2 in which the plurality of stones 11 is placed on the e-paper 12 and the stone seat 14. Furthermore, in the case of the multi-stone decorative article 1, for example, different display patterns can be displayed in the respective regions of the plurality of stones 11 as illustrated in FIG. 8. FIG. 8 illustrates an example in which the e-paper 12 displays black, a certain motif, and white in the regions of the left, center, and right stones 11 of the three stones 11, respectively.

5. Schematic Configuration Example of Second Embodiment of Decorative Article FIG. 9 is a cross-sectional diagram illustrating schematic configuration examples of a second embodiment of a decorative article.

In the second embodiment, the decorative article 1 further includes a 50/50 beam splitter 51 between the stone 11 and the e-paper 12. Other configurations are similar to those of the first embodiment illustrated in FIG. 1.

Figure 9:
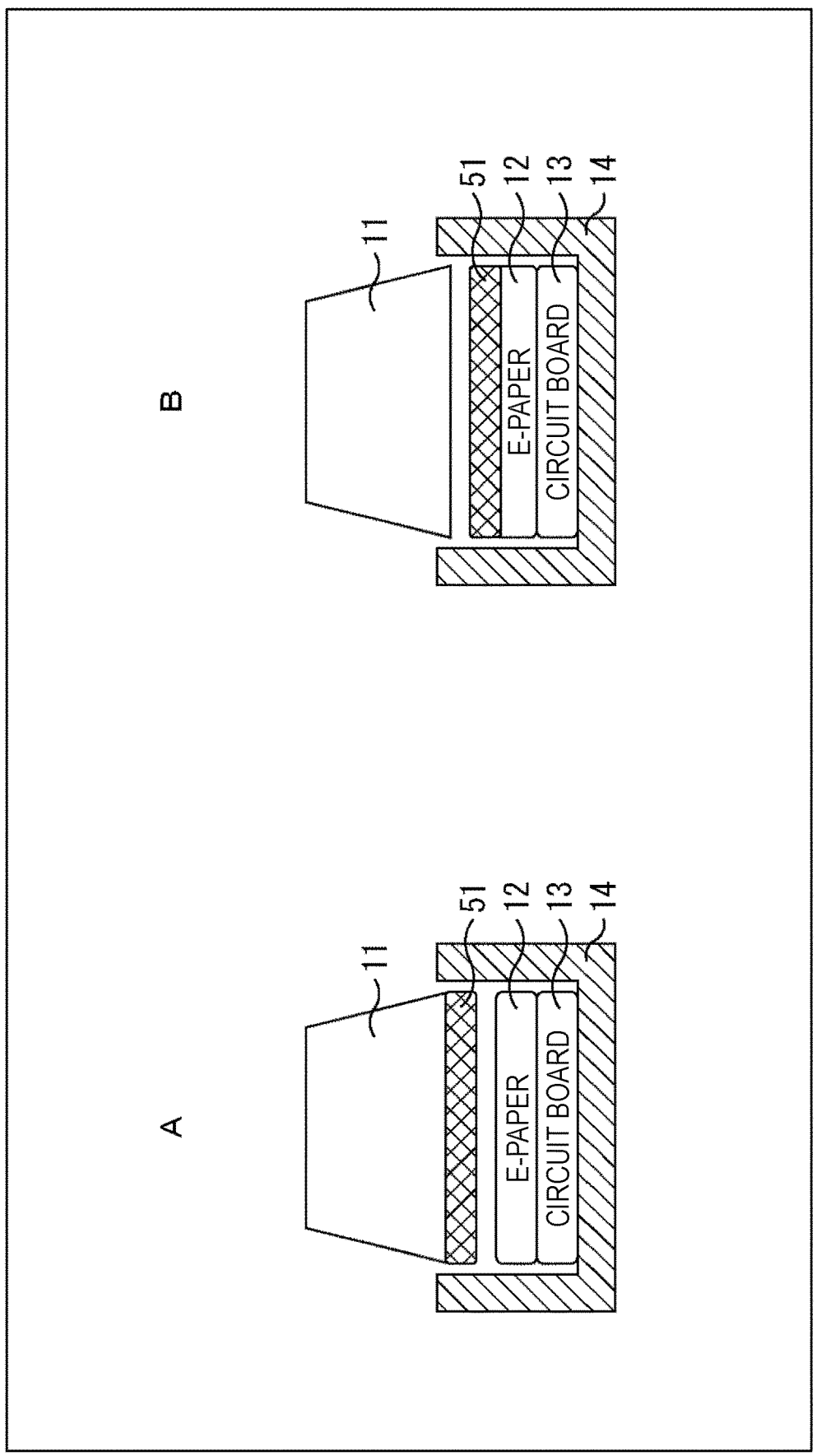
FIG. 9 is a cross-sectional diagram illustrating schematic configuration examples of a second embodiment of a decorative article.

A of FIG. 9 illustrates a configuration in which the 50/50 beam splitter 51 is deposited on the bottom surface of the stone 11 by evaporation. B of FIG. 9 illustrates a configuration in which the 50/50 beam splitter 51 is deposited on or bonded to the outermost surface of the e-paper 12. The 50/50 beam splitter 51 is arranged in the entire planar region between the stone 11 and the e-paper 12.

Various colors and motifs can be expressed in the decorative article 1 by controlling the display pattern of the e-paper 12. However, the e-paper 12 provided between the stone 11 and the stone seat 14 reduces the reflectance and the inherent sparkle of the stone 11.

In this regard, the second embodiment further includes the 50/50 beam splitter 51 between the stone 11 and the e-paper 12 so that the 50/50 beam splitter 51 reflects half of the incident light in front of the e-paper 12, whereby the sparkle of the stone 11 can be enhanced.

6. Schematic Configuration Example of Third Embodiment of Decorative Article FIG. 10 is a cross-sectional diagram illustrating schematic configuration examples of a third embodiment of a decorative article.

In the third embodiment, the decorative article 1 further includes mirrors 52 between the stone 11 and the e-paper 12. Other configurations are similar to those of the first embodiment illustrated in FIG. 1.

Figure 10:
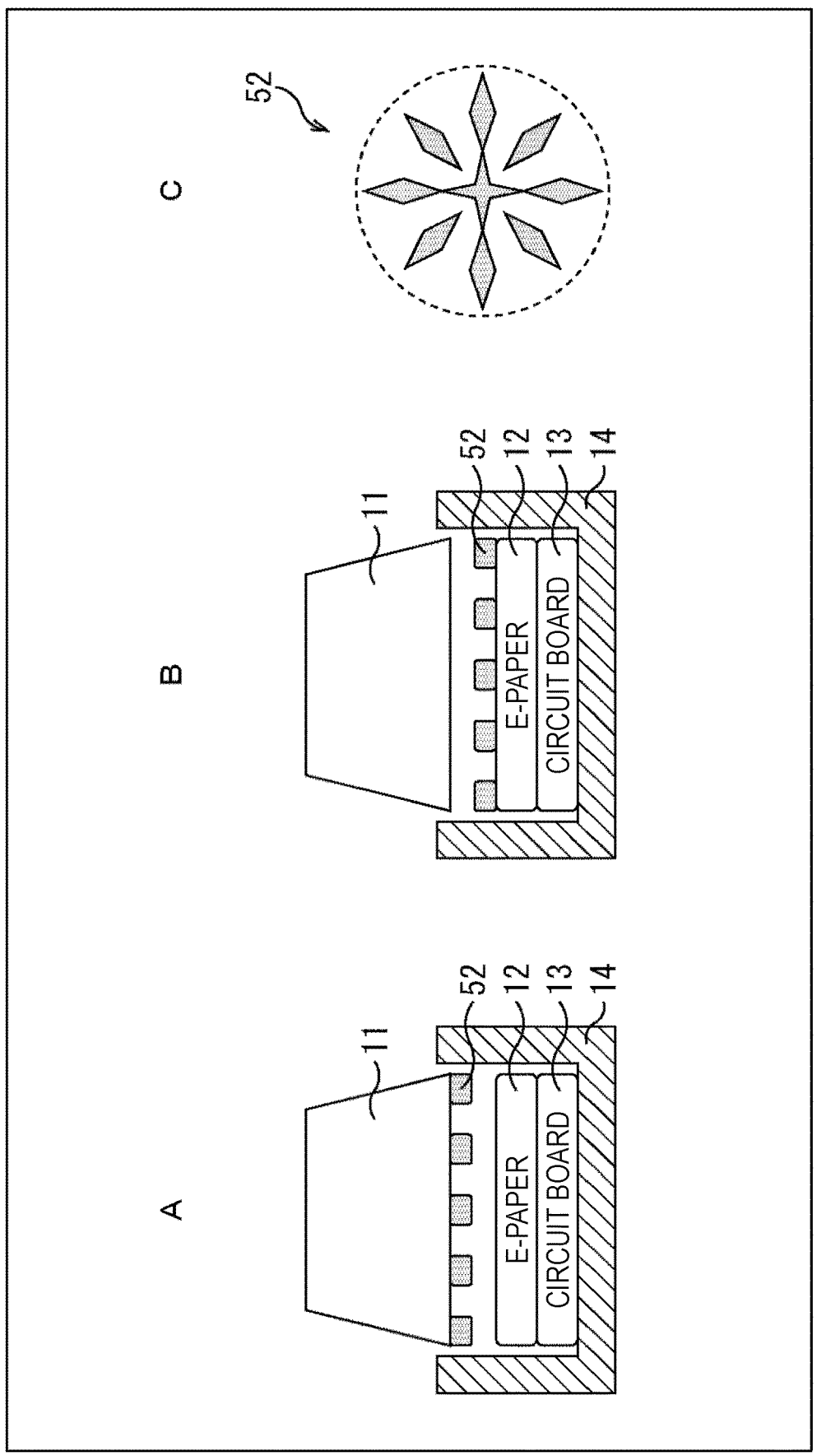
FIG. 10 is a cross-sectional diagram illustrating schematic configuration examples of a third embodiment of a decorative article.

A of FIG. 10 illustrates a configuration in which the mirrors 52 are deposited on the bottom surface of the stone 11 by evaporation. B of FIG. 10 illustrates a configuration in which the mirrors 52 are deposited on or bonded to the outermost surface of the e-paper 12. As illustrated in the plan view of C of FIG. 10, for example, the mirrors 52 are arranged in accordance with the cut shape of the stone 11 in a part of the planar region between the stone 11 and the e-paper 12.

In this manner, the mirrors 52 are further provided in a part of the planar region between the stone 11 and the e-paper 12 so as to provide a region where the incident light is totally reflected, whereby the sparkle of the stone 11 can be enhanced.

7. Fourth Embodiment of Decorative Article

Next, a fourth embodiment of a decorative article will be described.

The appearance shape of the decorative article 1 of the fourth embodiment is similar to that of the first embodiment depicted in FIGS. 1 and 2. The display control of the e-paper 12 of the decorative article 1 of the fourth embodiment is partially different from that of the first embodiment.

<Control Block Diagram>

Figure 11:
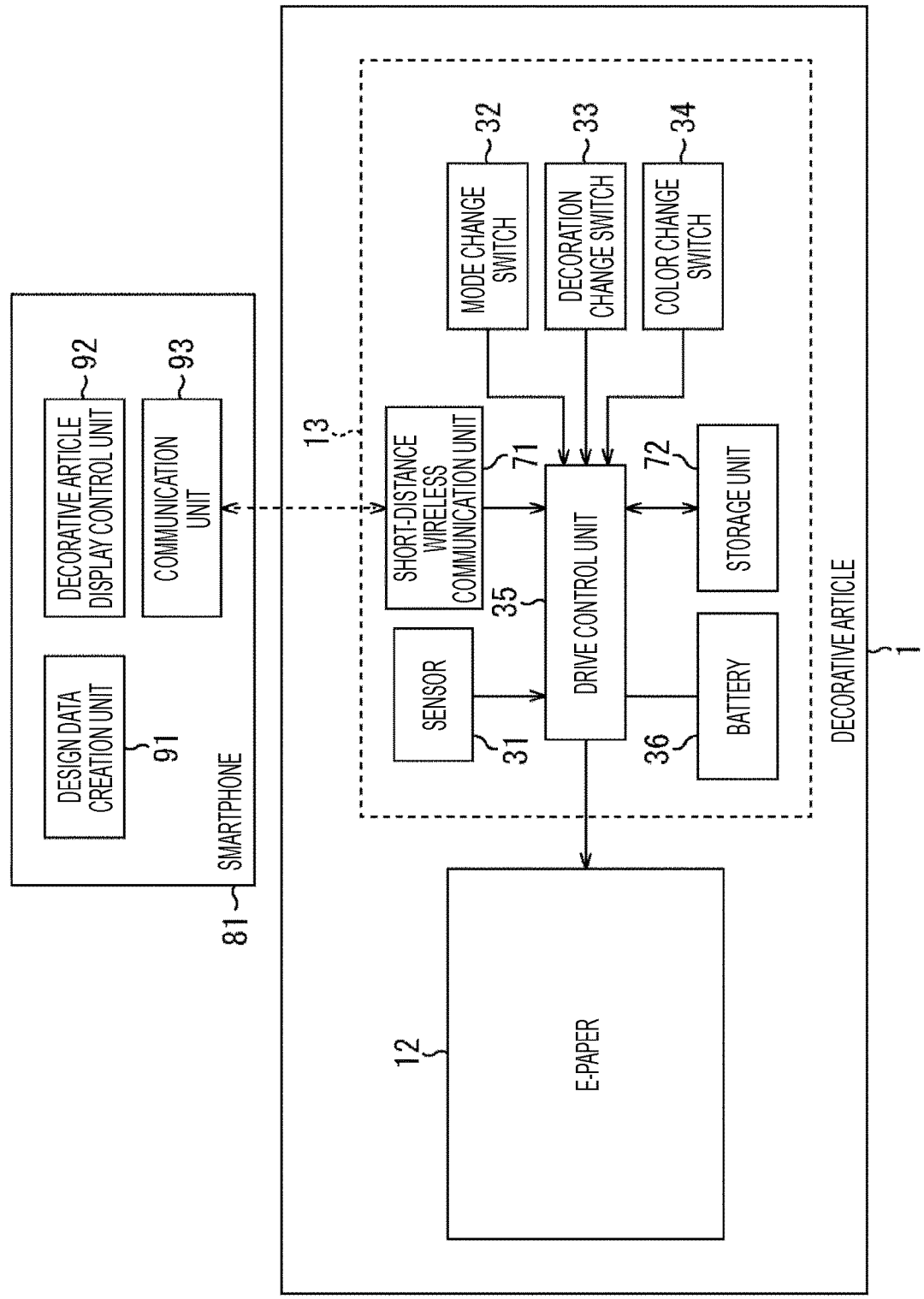
FIG. 11 is a control block diagram of a fourth embodiment of a decorative article.

FIG. 11 is a control block diagram of the decorative article according to the fourth embodiment.

In FIG. 11, components corresponding to those of the control block diagram of the decorative article 1 according to the first embodiment illustrated in FIG. 3 are denoted by the same reference signs, and the description of these components is omitted as appropriate.

The decorative article 1 of the fourth embodiment is different from that of the first embodiment illustrated in FIG. 3 in that a short-distance wireless communication unit 71 and a storage unit 72 are newly provided in the circuit board 13.

Furthermore, FIG. 11 also illustrates a smartphone 81 as a communication partner with which the short-distance wireless communication unit 71 of the decorative article 1 performs short-distance wireless communication.

The smartphone 81 has a design data creation unit 91, a decorative article display control unit 92, and a communication unit 93 for the display control of the decorative article 1.

The short-distance wireless communication unit 71 is a communication device that performs short-distance wireless communication with another communication apparatus such as the smartphone 81 using, for example, short-distance wireless communication such as near field communication (NFC), infrared communication, Bluetooth (registered trademark), wireless local area network (LAN), or the like.

The storage unit 72 stores various data such as design data acquired by the short-distance wireless communication unit 71 performing short-distance wireless communication with the smartphone 81 and correction information for correcting design data according to the cut shape of the stone 11.

The design data creation unit 91 of the smartphone 81 accepts an operation input of a display pattern that the user wants to display on the e-paper 12, and creates design data corresponding to the accepted display pattern. The design data created by the design data creation unit 91 are supplied to the decorative article display control unit 92. The decorative article display control unit 92 transmits the design data supplied from the design data creation unit 91 to the decorative article 1 via the communication unit 93. The drive control unit 35 controls the display on the e-paper 12 on the basis of the design data received by the short-distance wireless communication unit 71.

Furthermore, the decorative article display control unit 92 controls the display on the e-paper 12 of the decorative article 1 in conjunction with the function of the smartphone 81. Specifically, the decorative article display control unit 92 generates control information for changing the display on the e-paper 12 in accordance with the contents that the smartphone 81 wishes to notify the user, such as an incoming call, reception of an electronic mail, and notification of an update program at the smartphone 81, and transmits the control information to the decorative article 1 via the communication unit 93.

The drive control unit 35 of the decorative article 1 controls the display on the e-paper 12 according to the control information from the decorative article display control unit 92 of the smartphone 81 received by the short-distance wireless communication unit 71. The user can recognize a certain event that has occurred in the smartphone 81 in response to the display on the e-paper 12 being changed to a certain display pattern corresponding to the notification. What kind of display is to be provided for each kind of notification can be set in advance or can be set by a setting function or the like provided in the decorative article display control unit 92.

Moreover, the decorative article display control unit 92 transmits, to the decorative article 1 via the communication unit 93, the output value of a certain sensor of the smartphone 81, e.g., a GPS sensor, an acceleration sensor, or the like, as control information for changing the display on the e-paper 12. The drive control unit 35 controls (changes) the display according to the output value of the sensor of the smartphone 81 as in the case of changing the display according to the output value of the sensor 31.

The design data creation unit 91 and the decorative article display control unit 92 are realized, for example, by an arithmetic processing unit such as a central processing unit (CPU) and a micro processing unit (MPU) executing a certain application program. The design data creation unit 91 and the decorative article display control unit 92 may be realized by different application programs or may be realized by one application program.

The communication unit 93 has a short-distance wireless communication function based on a communication scheme conforming to short-distance wireless communication performed by the short-distance wireless communication unit 71 of the decorative article 1. Therefore, the communication unit 93 also includes a communication device that performs short-distance wireless communication using NFC, infrared communication, Bluetooth (registered trademark), wireless LAN, or the like.

Furthermore, the communication unit 93 also has a communication function for connecting to a network such as the Internet, a local area network (LAN), and a wide area network (WAN). As a result, the communication unit 93 can access a certain server apparatus over a network such as the Internet.

Figure 12:
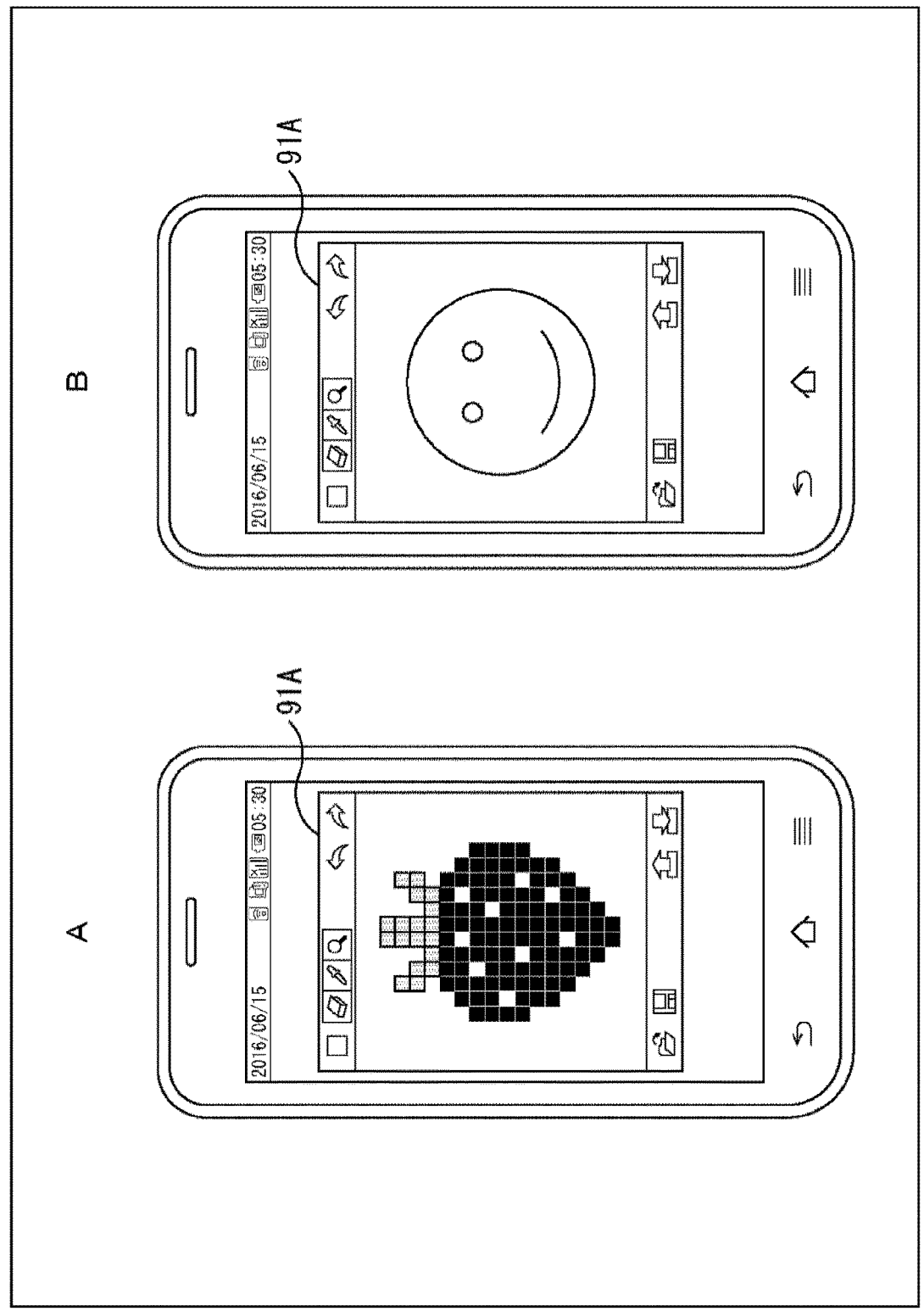
FIG. 12 is a diagram illustrating examples of creating display patterns.

FIG. 12 illustrates examples in which the user creates display patterns to be displayed on the e-paper 12.

A of FIG. 12 illustrates an example in which the user creates a display pattern by performing the operation of setting a certain color for each dot of the dot matrix in a design data creation application 91A as the design data creation unit 91.

B of FIG. 12 illustrates an example in which the face of the user is photographed using the design data creation application 91A as the design data creation unit 91, and the resulting image is used as a display pattern.

Design data corresponding to the display patterns created as illustrated in A and B of FIG. 12 are transmitted from the design data creation application 91A to the drive control unit 35 of the decorative article 1 via the communication unit 93 and the short-distance wireless communication unit 71. Then, the drive control unit 35 controls the display on the e-paper 12 according to the design data from the design data creation application 91A. Design data include, for example, two-dimensional array data of pixels having pixel values represented by monochrome or RGB 8-bit gradation.

A and B of FIG. 13 illustrate examples in which the display pattern illustrated in B of FIG. 12 is displayed on the e-paper 12.

As illustrated in A of FIG. 13, the drive control unit 35 can display the display pattern on the e-paper 12 such that it looks like the display pattern displayed on the design data creation application 91A of the smartphone 81.

Alternatively, the drive control unit 35 can display, on the e-paper 12, the display pattern adjusted according to the cut shape of the stone 11 as illustrated in B of FIG. 13.

<Operation Example for NFC Communication>

Figure 14:
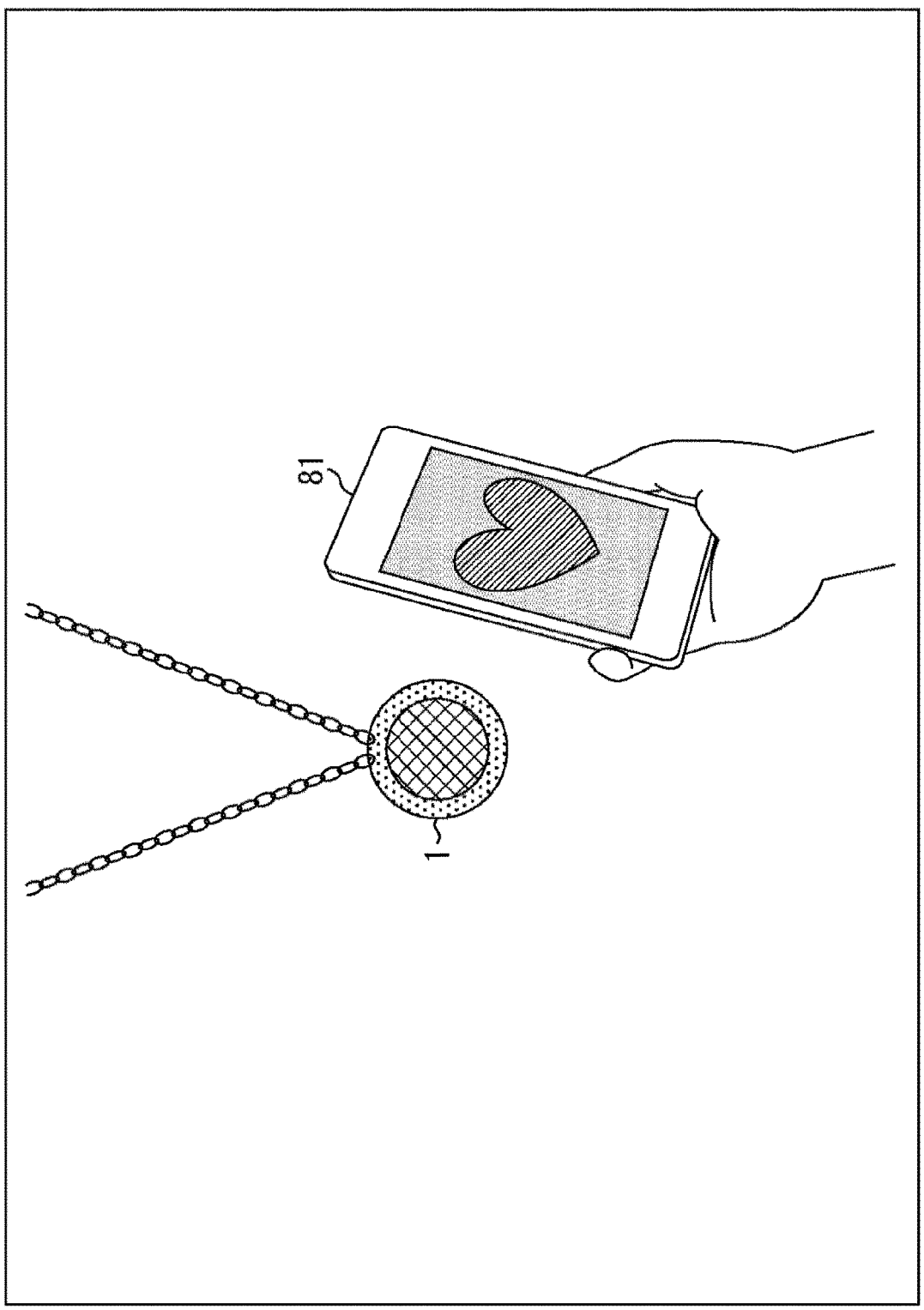
FIG. 14 is a diagram illustrating an operation example for NFC communication.

FIG. 14 illustrates an operation example in which the short-distance wireless communication unit 71 performs NFC communication.

As the operation of transferring design data to the smartphone 81, the user performs the operation of bringing the smartphone 81 close to the decorative article 1 while the display pattern to be transferred to the display is displayed as illustrated in FIG. 14.

When the smartphone 81 is brought within several centimeters of the decorative article 1, the short-distance wireless communication unit 71 and the drive control unit 35 of the decorative article 1 receive radio waves from the smartphone 81, which is a reader/writer, and are activated.

Then, the short-distance wireless communication unit 71 of the decorative article 1 receives design data corresponding to the display pattern displayed on the display from the smartphone 81, and supplies the design data to the drive control unit 35. The drive control unit 35 changes the display on the e-paper 12 on the basis of the supplied design data.

As a result, the e-paper 12 of the decorative article 1 is changed to the display pattern displayed on the smartphone 81.

In a case where the short-distance wireless communication performed by the short-distance wireless communication unit 71 is NFC communication, the power supply can be acquired from the communication unit 93 of the smartphone 81 as a reader/writer. The e-paper 12 requires a flow of current only when switching the display, and does not require a flow of current in order to keep the display. Therefore, in a case where the short-distance wireless communication is NFC communication, the battery 36 can be removed from the configuration of the decorative article 1.

<Design Data Correction Process>

In the fourth embodiment, the drive control unit 35 corrects design data transmitted from the smartphone 81 according to the cut shape of the stone 11 using correction information stored in the storage unit 72, and causes the e-paper 12 to display the display pattern on the basis of the corrected design data.

Figure 15:
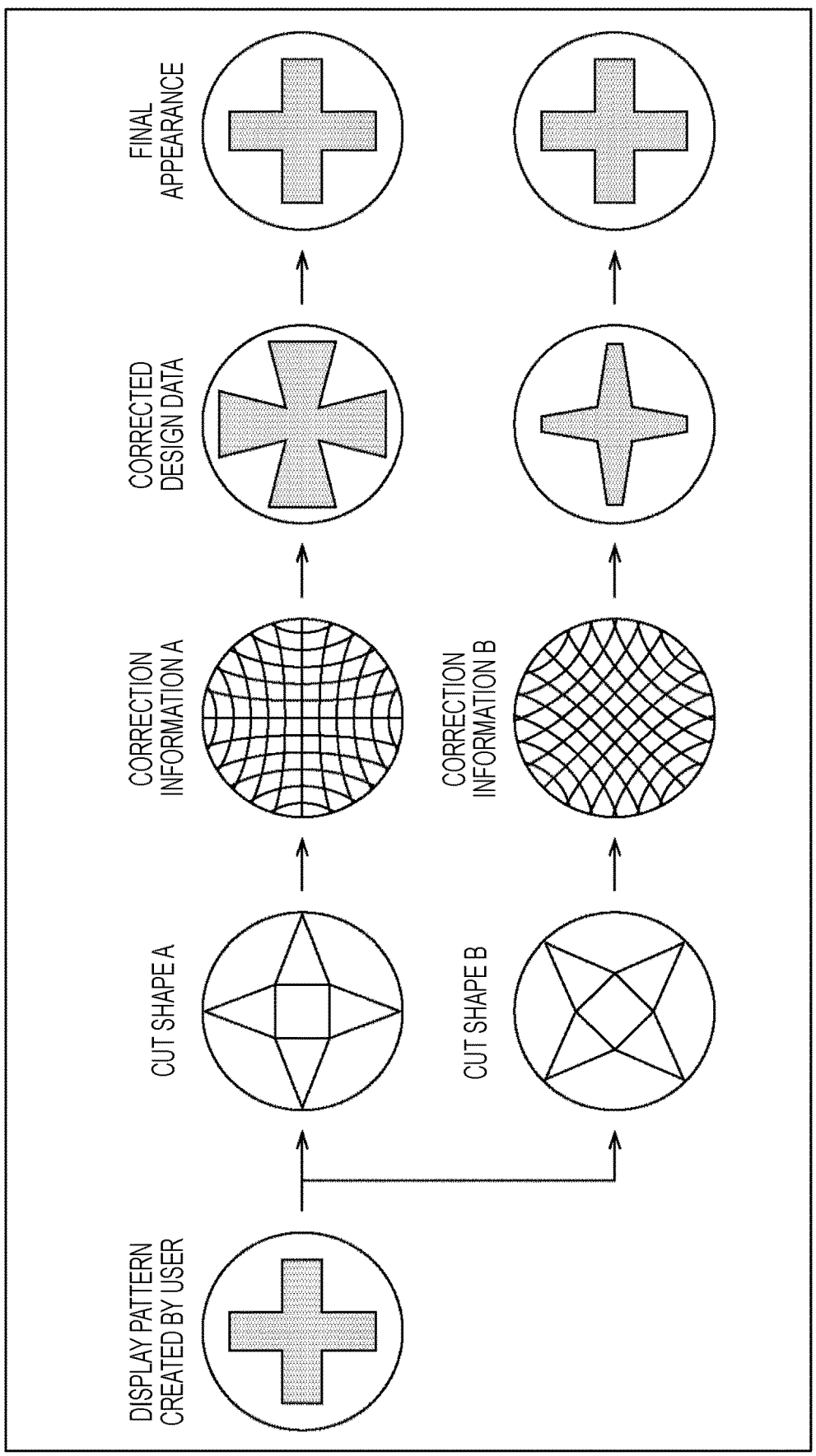
FIG. 15 is a diagram for explaining a design data correction process.

FIG. 15 is a diagram for explaining a design data correction process for correcting design data according to the cut shape of the stones 11 performed by the drive control unit 35.

Suppose the display pattern created by the user on the smartphone 81 is the cross pattern illustrated at the left end of FIG. 15.

The storage unit 72 stores correction information for correcting the design pattern so that the display pattern created by the user on the smartphone 81 coincides with the display pattern seen through the stone 11 of the decorative article 1.

For example, in a case where the cut shape of the decorative article 1 is cut shape A, the storage unit 72 stores correction information that causes the process of expanding the spacing in the cross direction, for example, as illustrated as correction information A in FIG. 15. Using correction information A, the drive control unit 35 corrects the design data corresponding to the display pattern created by the user, and generates corrected design data. As illustrated in FIG. 15, the corrected design data are data deformed such that the pattern width of the cross pattern becomes larger from the center to the ends. The drive control unit 35 controls the drive voltage of the e-paper 12 on the basis of the corrected design data, whereby the display pattern of the e-paper 12 that the user sees through the stone 11 of the decorative article 1 looks similar to the display pattern created by the user as illustrated at the right end of FIG. 15.

Further, for example, in a case where the cut shape of the decorative article 1 is cut shape B obtained by rotating cut shape A by 45 degrees, the drive control unit 35 uses correction information B that causes the process of narrowing the spacing in the cross direction to correct the design data corresponding to the display pattern created by the user. As illustrated in FIG. 15, the corrected design data are data deformed such that the pattern width of the cross pattern becomes smaller from the center to the ends. The drive control unit 35 controls the drive voltage of the e-paper 12 on the basis of the corrected design data, whereby the display pattern of the e-paper 12 that the user sees through the stone 11 of the decorative article 1 looks similar to the display pattern created by the user as illustrated at the right end of FIG. 15.

In this way, the drive control unit 35 corrects design data using correction information stored in the storage unit 72, and controls the e-paper 12 on the basis of the corrected design data. This allows the display pattern seen by the user through the stone 11 of the decorative article 1 to coincide with the display pattern created on the smartphone 81 in consideration of the refraction of light due to the cut shape of the stone 11.

<Display Pattern Transfer Process>

A display pattern transfer process for displaying the display pattern created by the user on the smartphone 81 on the e-paper 12 of the decorative article 1 will be described with reference to the flowchart of FIG. 16.

First, in step S51, the design data creation unit 91 of the smartphone 81 creates design data corresponding to the display pattern input by the user.

In step S52, the design data creation unit 91 determines whether the transfer operation for transferring the display pattern created by the user to the decorative article 1 has been performed. In a case where it is determined in step S52 that the transfer operation has not been performed, the process returns to step S51, and the processes in steps S51 and S52 are repeated.

On the other hand, in a case where it is determined in step S52 that the transfer operation has been performed, the process proceeds to step S53, and the design data creation unit 91 transmits, to the decorative article 1, the design data corresponding to the display pattern created by the user via the decorative article display control unit 92 and the communication unit 93.

In step S54, the drive control unit 35 of the decorative article 1 receives the design data transmitted from the smartphone 81 via the short-distance wireless communication unit 71. Moreover, the drive control unit 35 executes, for the received design data, a correction process based on correction information stored in the storage unit 72.

In step S55, the drive control unit 35 controls the drive voltage of the e-paper 12 on the basis of the corrected design data, and rewrites the display on the e-paper 12.

According to the above display pattern transfer process, a desired display pattern created by the user on the smartphone 81 can be displayed on the e-paper 12 of the decorative article 1. In this case, the process of correcting received design data using correction information stored in the storage unit 72 allows the display pattern created by the user on the smartphone 81 to coincide with the display pattern seen by the user through the stone 11 of the decorative article 1.

<Configuration Example of Display Pattern Providing System>

Figure 16:
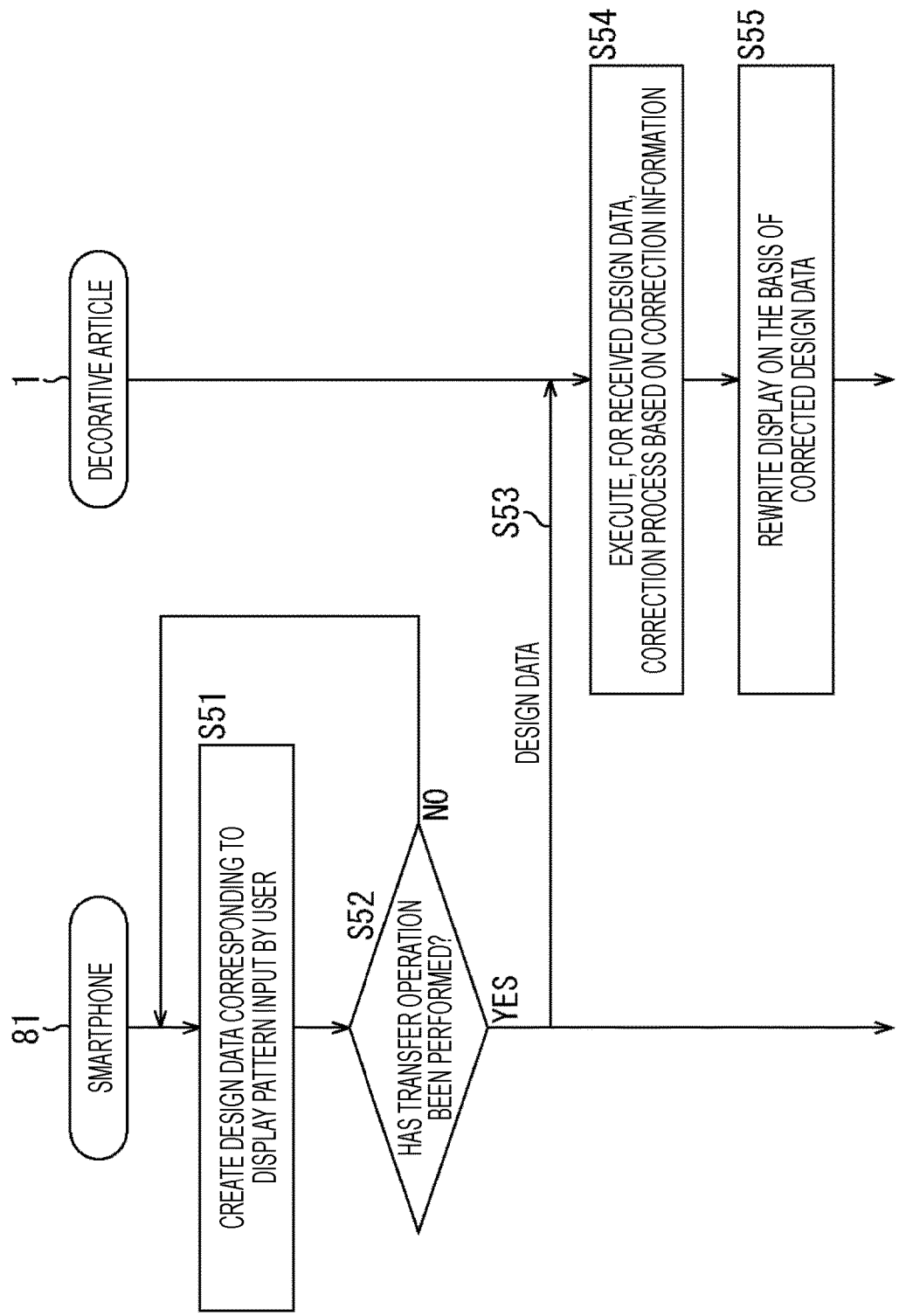
FIG. 16 is a flowchart illustrating a display pattern transfer process.

The display pattern transfer process described with reference to FIG. 16 is an example in which the user of the decorative article 1 creates a display pattern by him/herself for display on the decorative article 1.

However, it is also possible to display a display pattern created by another user such as a creator on the decorative article 1.

Furthermore, the design data correction process for correcting design data according to the cut shape of the decorative article 1 can be executed on the smartphone 81, a server apparatus, or the like, instead of on the decorative article 1. In this case, the decorative article 1 need not necessarily hold correction information for correcting design data according to the cut shape of the stone 11, and the decorative article 1 only needs to hold cut shape identification information indicating its cut shape.

Hereinafter, an example in which the decorative article 1 holds cut shape identification information, and the display pattern created by the creator is corrected on the smartphone 81, transferred to the decorative article 1, and displayed on the e-paper 12 will be described.

Figure 17:
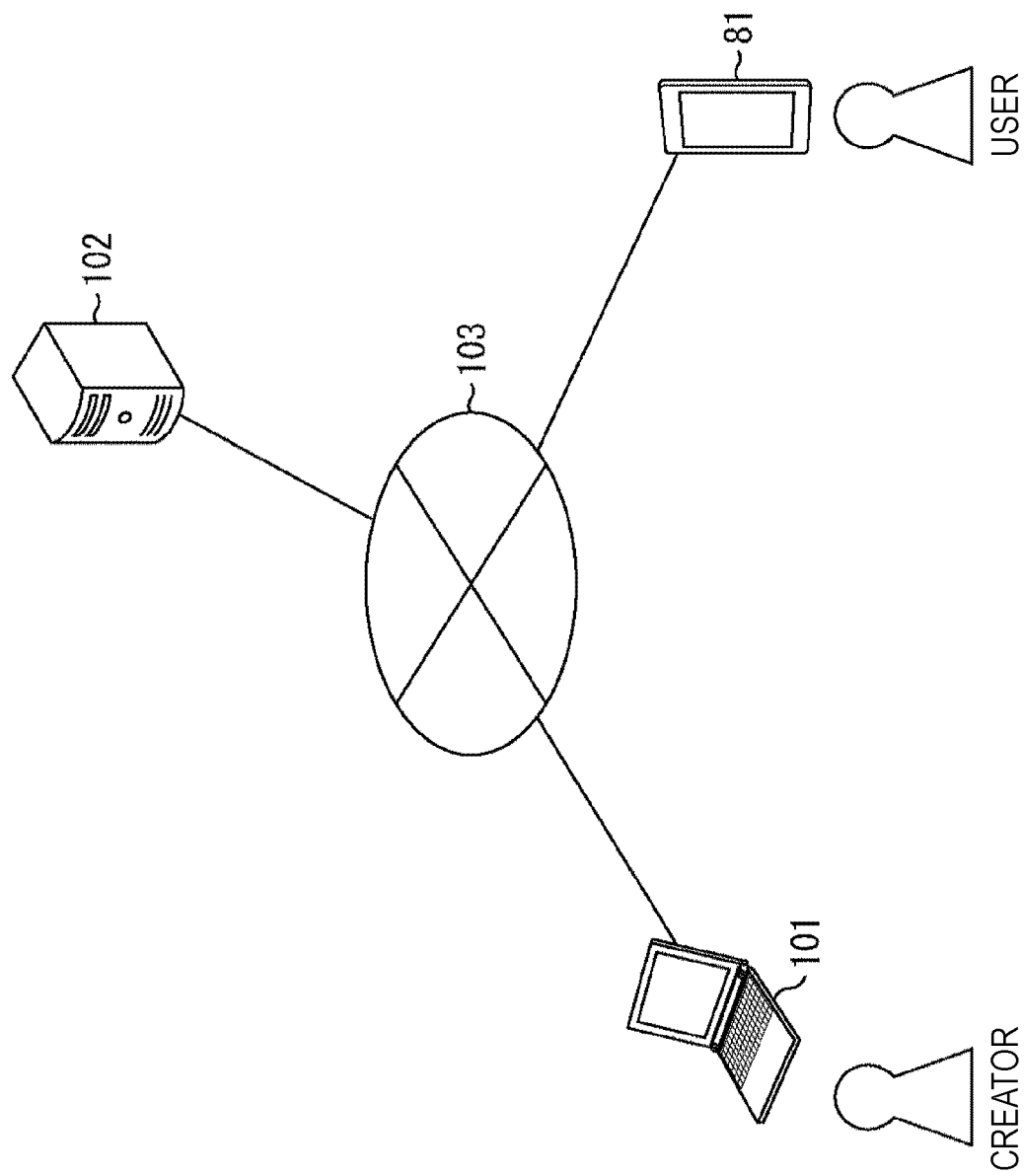
FIG. 17 is a diagram illustrating a configuration example of a display pattern providing system.

FIG. 17 illustrates a configuration example of a display pattern providing system (communication system) for realizing a display pattern providing service enabling the creator and the user to exchange a display pattern.

The display pattern providing system at least includes a terminal apparatus 101 operated by the creator, a server 102 in which design data of a display pattern provided by the creator to the user and correction information of the stone 11 are registered, and the smartphone 81 to which the user downloads the design data. In the actual display pattern providing system, many creators and users can access the server 102 using their own terminal apparatuses. However, one creator and one user are depicted here for ease of explanation.

The terminal apparatus 101 includes, for example, a personal computer (PC), a laptop PC, a tablet, a smartphone, or the like, and has at least a network communication function.

The terminal apparatus 1011, the server 102, and the smartphone 81 are connected via a network 103 such as the Internet, a local area network (LAN), and a wide area network (WAN).

The server 102 stores design data of display patterns uploaded by creators. When the user accesses a certain address (URL) of the server 102, the server 102 provides display patterns provided by many creators on the web to the user. In other words, a net shop that provides design data corresponding to display patterns of the decorative article 1 is realized by the server 102.

Figure 18:
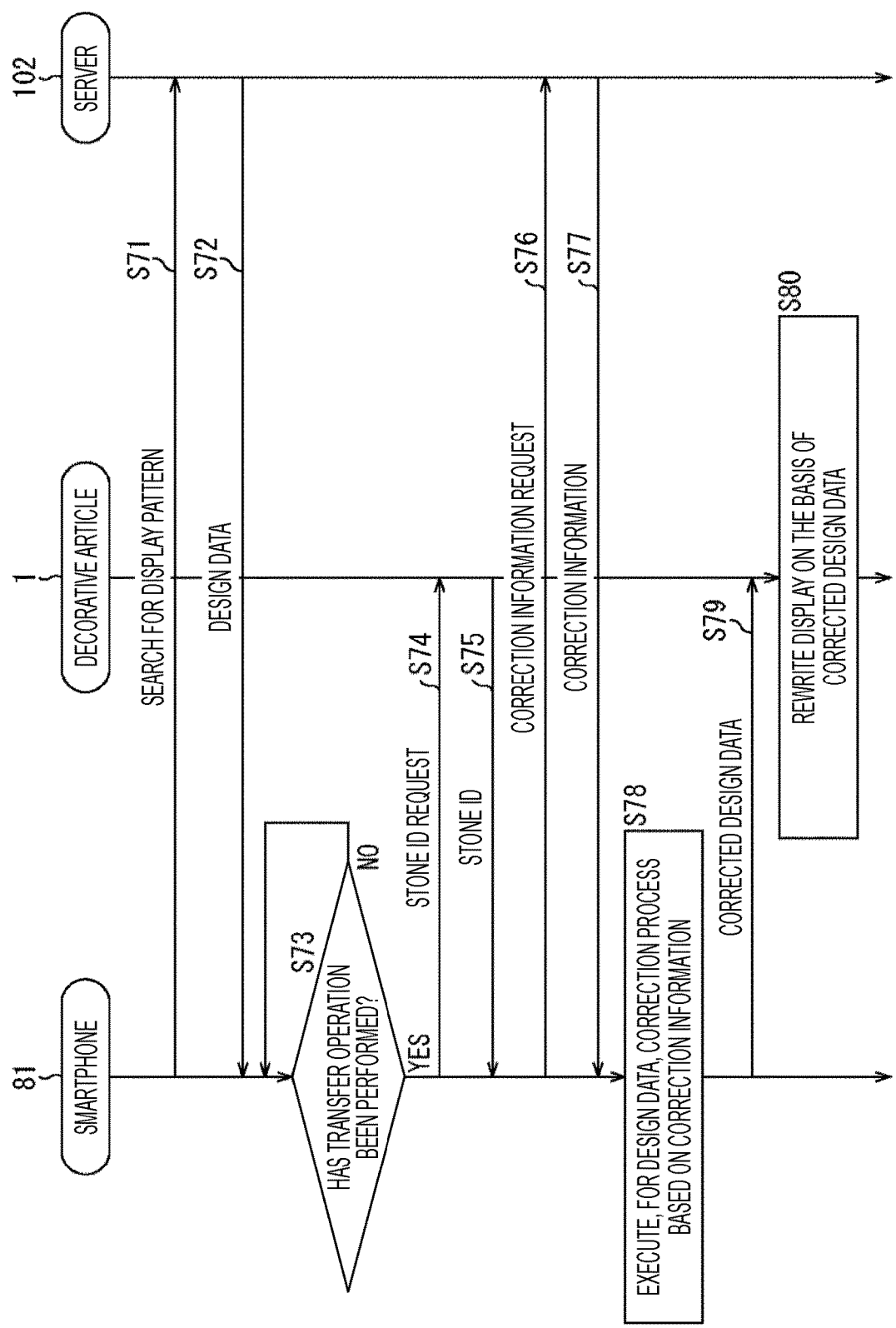
FIG. 18 is a flowchart illustrating a design data providing process.

A design data providing process executed by the display pattern providing system of FIG. 17 will be described with reference to the flowchart of FIG. 18.

First, in step S71, the smartphone 81 accesses a certain address of the server 102 from a browser or the like in accordance with the operation of the user so as to access a site (net shop) where display patterns for the decorative article 1 created by many creators can be browsed and purchased, and searches for a desired display pattern.

In response to a request from the browser of the smartphone 81, the server 102 transmits, to the smartphone 81, a web page for displaying a list of display patterns for the decorative article 1 created by many creators, and causes the display of the smartphone 81 to show a design data list.

When the user looks at the list of display patterns and performs the operation of purchasing a desired display pattern, in step S72, the server 102 transmits, to the smartphone 81, design data corresponding to the display pattern purchased by the user. The smartphone 81 receives the design data transmitted from the server 102 and stores the design data in an internal memory.

In step S73, the smartphone 81 determines whether the transfer operation for transferring the display pattern to the decorative article 1 has been performed, and waits until it is determined that the transfer operation has been performed.

Then, in a case where it is determined in step S73 that the transfer operation has been performed, the process proceeds to step S74, and the smartphone 81 transmits, to the decorative article 1 using short-distance wireless communication, a stone ID request for requesting a stone ID identifying the stone 11. This stone ID is information which can identify the cut shape of the stone 11, and corresponds to cut shape identification information.

In step S75, the decorative article 1 receives the stone ID request transmitted from the smartphone 81, and returns its own stone ID stored in the storage unit 72 to the smartphone 81.

In step S76, the smartphone 81 receives the stone ID transmitted from the decorative article 1, and transmits a correction information request for requesting correction information to the server 102 together with the received stone ID.

In step S77, the server 102 receives the correction information request transmitted from the smartphone 81, and returns correction information corresponding to the stone ID transmitted together with the correction information request to the smartphone 81.

In step S78, the smartphone 81 executes, for the design data received in step S72, a correction process based on the correction information received in step S77.

Then, in step S79, the smartphone 81 transmits the corrected design data to the decorative article 1.

The decorative article 1 receives the corrected design data transmitted from the smartphone 81 in step S80, and controls the drive voltage of the e-paper 12 on the basis of the corrected design data to rewrite the display on the e-paper 12.

In this manner, the display pattern created by another user can be displayed on the decorative article 1. As a result, a wider variety of display patterns can be displayed on the decorative article 1. Since the design data correction process for correcting the appearance of the display pattern according to the cut shape of the stone 11 is executed on the smartphone 81, the storage unit 72 of the decorative article 1 only needs to hold the stone ID, reducing the load on the decorative article 1.

Note that the user purchases the display pattern created by the creator in the described example. However, the system may be a system that allows the user to acquire and utilize display patterns without charge.

Furthermore, although the design data correction process for correcting the appearance of the display pattern according to the cut shape of the stone 11 is executed on the smartphone 81 side, this process may be executed on the server 102. In this case, the smartphone 81 transmits the stone ID and design data to the server 102, and as a response thereto, acquires the corrected design data subjected to the design data correction process corresponding to the stone ID.

8. Other Application Examples of Decorative Articles

In the embodiment described above, the present technology is applied to the decorative article 1 used for rings, pendants, necklaces, earrings, and the like, for example. However, the present technology is applicable to all decorative articles including a stone and a stone seat.

Figure 19:
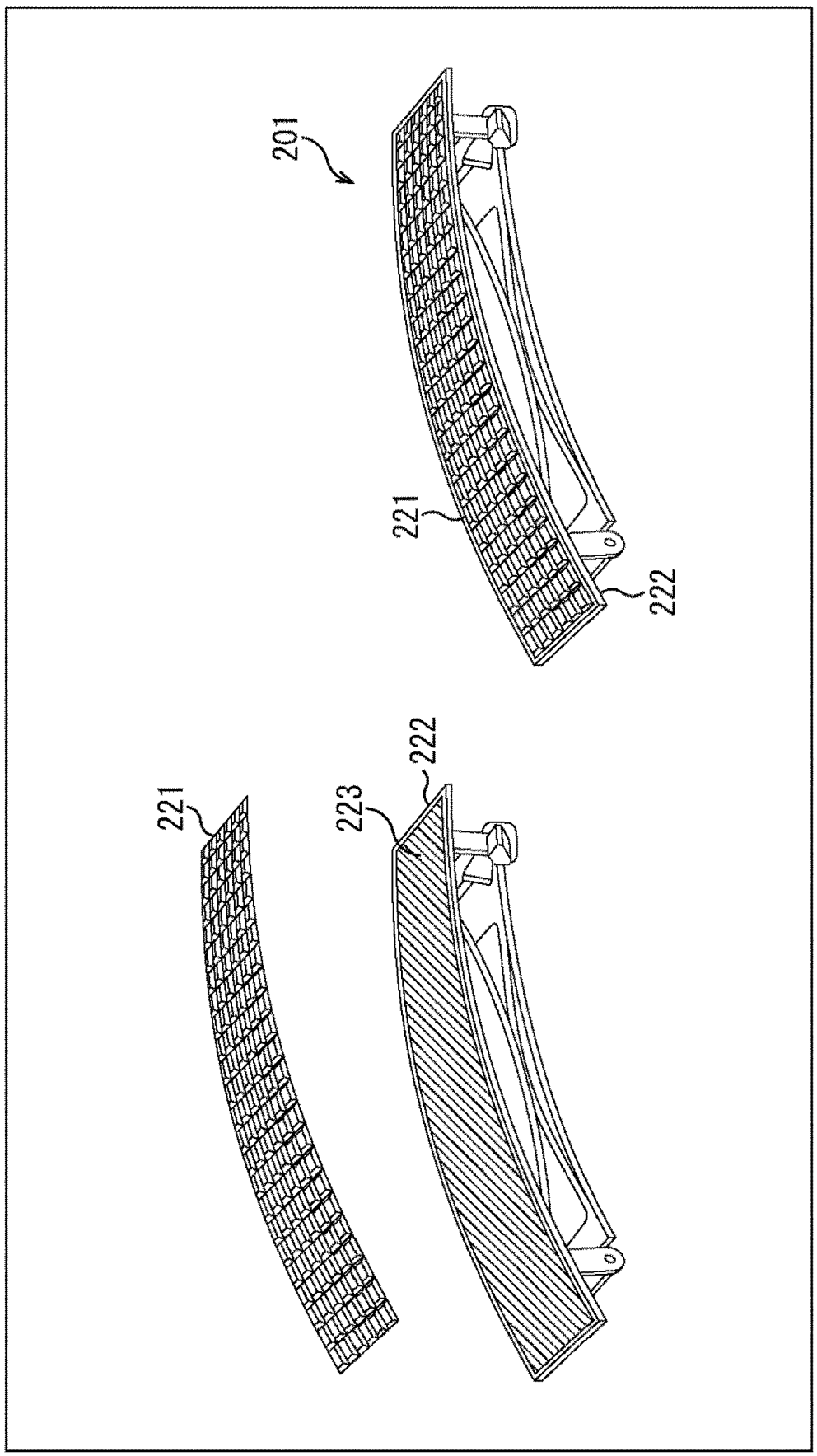
FIG. 19 is a diagram illustrating an example of a barrette to which the present technology is applied.

FIG. 19 illustrates an example in which the present technology is applied to a barrette (hair clip) which is another example of a decorative article.

The barrette 201 includes e-paper 223 arranged between a plurality of regularly arrayed stones 221 and a stone seat 222.

Figure 20:
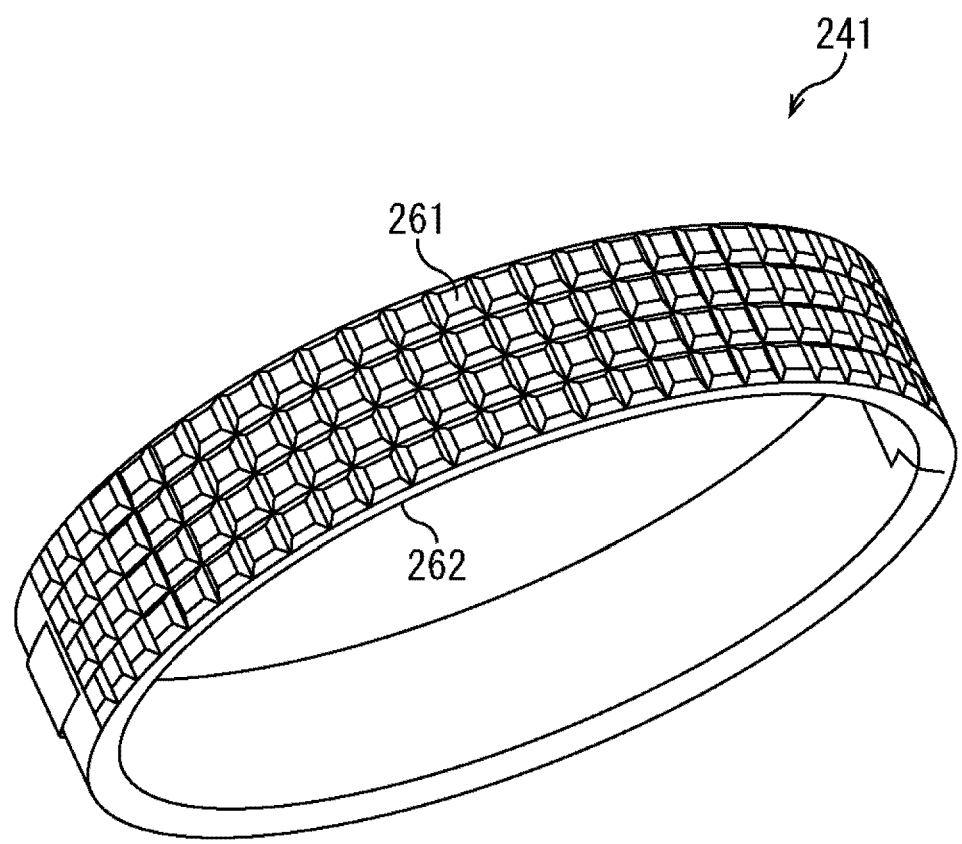
FIG. 20 is a diagram illustrating an example of a bracelet to which the present technology is applied.

FIG. 20 illustrates an example in which the present technology is applied to a bracelet which is still another example of a decorative article.

The bracelet 241 includes e-paper (not illustrated) arranged between a plurality of regularly arrayed stones 261 and a ring portion 262 as a stone seat.

In a case where a decorative article has a plurality of stones like the barrette 201 in FIG. 19 or the bracelet 241 in FIG. 20, each of the plurality of stones is assigned its stone ID described above.

Moreover, the present technology is not limited to the accessories described above, but can be generally applied to decorative apparatuses that decorate specific products.

Figure 21:
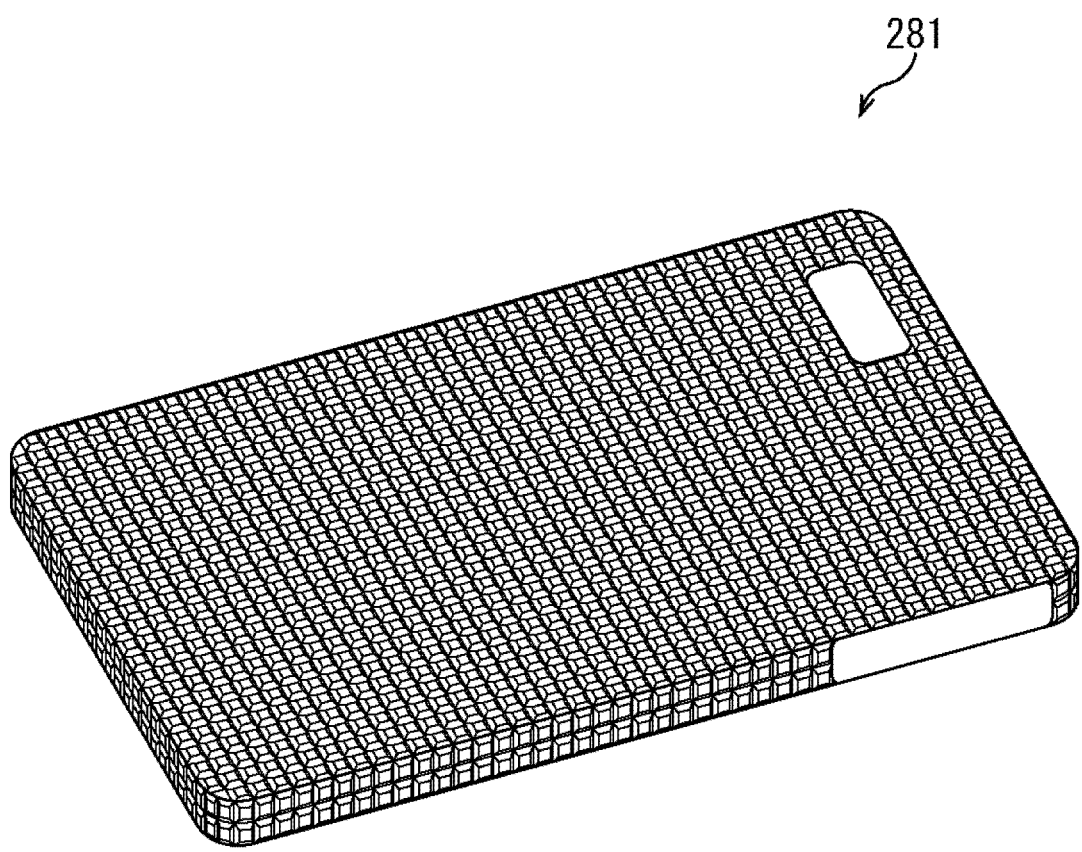
FIG. 21 is a diagram illustrating an example of a smartphone cover to which the present technology is applied.

For example, FIG. 21 illustrates an example in which the present technology is applied to a smartphone cover as a decorative apparatus.

The smartphone cover 281 in FIG. 21 includes what is called a cover case main body as a stone seat, e-paper arranged on the stone seat, and a plurality of stones arranged on the e-paper, whereby a plurality of stones is arranged on the entire outer surface of the smartphone cover 281 opposite to the surface in contact with a smartphone.

As described above, according to decorative apparatuses (including decorative articles) to which the present technology is applied, e-paper is arranged between the stone and the stone seat, and the display on the e-paper is controlled with the drive control unit, whereby the color or decoration can be variously changed without replacing the stone, and various ways of enjoyment can be obtained with a single type of stone. Furthermore, e-paper can express a decoration finer than the size of a stone and can provide a new way of enjoyment, i.e., a decoration emerging in the stone. Therefore, it is possible to provide a new way of enjoyment using e-paper.

Furthermore, in a case where decorative apparatuses (including decorative articles) include the function of communicating with another apparatus such as a smartphone, display on e-paper can be provided in cooperation with the operation of another apparatus. Furthermore, the color or decoration of a stone can be changed according to the notification from another apparatus, so that a new notification means can be provided.

In each of the above-described embodiments, e-paper is adopted as a flexible display arranged between a stone and a stone seat. Alternatively, an organic electro luminescence (EL) display or a liquid crystal display may be adopted.

In each of the above-described embodiments, the stone itself is colorless and transparent. Alternatively, the stone may have a certain color, or the multi-stone type including a plurality of stones may be a combination of colorless and colored stones.

The embodiments of the present disclosure are not limited to the above-mentioned embodiments, and can be variously changed in a range not departing from the gist of the present disclosure.

For example, an embodiment that combines all or some of the above-mentioned plurality of embodiments can be employed.

The steps described in the flowcharts may be performed chronologically according to the described order, but do not necessarily be processed chronologically. The steps may be executed parallelly or at a necessary timing such as when a call is made.

Furthermore, the steps described in the above-mentioned flowcharts can be executed by a single apparatus, or can be shared and executed by a plurality of apparatuses.

Moreover, in a case where a plurality of processes is included in a single step, the plurality of processes included in the single step can be executed by a single apparatus, or can be shared and executed by a plurality of apparatuses.

Note that in the present specification, a system means a collection of a plurality of components (apparatuses, modules (parts), and the like), whether or not all the components exist in the same housing. Therefore, both a plurality of apparatuses housed in separate housings and coupled via a network and a single apparatus including a single housing in which a plurality of modules is housed are systems.

Note that the effects described in the present specification are merely examples and not limited. Effects other than those described in the present specification may also be obtained.

Note that the present technology can also be configured as follows.

(1)

A decorative apparatus including:

a thin-plate display arranged between a stone and a stone seat; and a drive control unit that controls display on the display.

(2)

The decorative apparatus according to (1), further including at least one sensor, in which the drive control unit controls display on the display according to an output value from the sensor.

(3)

The decorative apparatus according to (2), in which the drive control unit switches a display decoration of the display according to the output value from the sensor.

(4)

The decorative apparatus according to (2) or (3), in which the drive control unit switches a display color of the display according to the output value from the sensor.

(5)

The decorative apparatus according to any of (1) to (4), in which the sensor is any of an acceleration sensor, an illuminance sensor, a heartbeat sensor, a GPS sensor, an altitude sensor, an atmospheric pressure sensor, a human sensor, and a geomagnetic sensor.

(6)

The decorative apparatus according to any of (1) to (5), further including a switch that accepts a switching operation by a user, in which the drive control unit controls display on the display according to the switching operation accepted by the switch.

(7)

The decorative apparatus according to (6), in which the drive control unit switches a display decoration of the display in response to the switching operation.

(8)

The decorative apparatus according to (6) or (7), in which the drive control unit switches a display color of the display in response to the switching operation.

(9)

The decorative apparatus according to any of (1) to (8), in which the drive control unit performs control to change display on the display at regular time intervals.

(10)

The decorative apparatus according to any of (1) to (9), further including a short-distance wireless communication unit that performs short-distance wireless communication with another apparatus, in which the drive control unit controls display on the display according to control information from the other apparatus received by the short-distance wireless communication.

(11)

The decorative apparatus according to (10), in which the short-distance wireless communication unit receives information indicating contents that the other apparatus wishes to notify the user, and the drive control unit changes display on the display according to the contents that the other apparatus wishes to notify the user.

(12)

The decorative apparatus according to (10) or (11), in which the short-distance wireless communication unit receives an output value of a sensor of the other apparatus, and the drive control unit controls display on the display according to the output value of the sensor of the other apparatus.

(13)

The decorative apparatus according to any of (1) to (12), further including a short-distance wireless communication unit that receives design data from another apparatus using short-distance wireless communication, in which the drive control unit controls display on the display on the basis of the design data.

(14)

The decorative apparatus according to (13), further including a storage unit that stores correction information for correcting the design data according to a shape of the stone, in which the drive control unit controls display on the display on the basis of the design data subjected to a correction process based on the correction information.

(15)

The decorative apparatus according to (13), further including a storage unit that stores shape information that is information regarding a shape of the stone, in which the short-distance wireless communication unit transmits the shape information to the other apparatus, and receives the design data subjected to a correction process based on the shape information, and the drive control unit controls display on the display on the basis of the design data subjected to the correction process.

(16)

The decorative apparatus according to any of (1) to (15), in which a 50/50 beam splitter is provided between the stone and the display.

(17)

The decorative apparatus according to (16), in which the 50/50 beam splitter is arranged in an entire planar region between the stone and the display.

(18)

The decorative apparatus according to any of (1) to (10), in which a mirror is provided in a part of a planar region between the stone and the display.

(19)

A drive control method for a decorative apparatus, the decorative apparatus including:

a thin-plate display arranged between a stone and a stone seat; and a drive control unit that drives the display, in which the drive control unit controls display on the display.

(20)

A communication system including a decorative apparatus and a terminal apparatus, in which
the decorative apparatus includes:
a thin-plate display arranged between a stone and a stone seat;
a drive control unit that controls display on the display; and
a communication unit that performs wireless communication with the terminal apparatus, and
the terminal apparatus transmits control information for changing display on the display to the communication unit.

REFERENCE SIGNS LIST

1 Decorative article
11 Stone
12 E-paper
13 Circuit board
14 Stone seat
31 Sensor
32 Mode change switch
33 Decoration change switch
34 Color change switch
Drive control unit
51 50/50 beam splitter
52 Mirror
71 Short-distance wireless communication unit
72 Storage unit
81 Smartphone
91 Design data creation unit
92 Decorative article display control unit
93 Communication unit
101 Terminal apparatus
102 Server
201 Barrette
241 Bracelet
281 Smartphone cover

The invention claimed is:

1. A decorative apparatus comprising:
a thin-plate display arranged between a stone and a stone seat;
a short-distance wireless communication unit configured to receive design data from another apparatus using short-distance wireless communication;
a storage unit configured to store correction information for correcting the design data according to a shape of the stone; and
a drive control unit configured to control a display pattern on the thin-plate display based on the received design data subjected to a correction process based on the stored correction information,
wherein the thin-plate display is configured to be flexibly deformed,
wherein the short-distance wireless communication unit and the drive control unit are each implemented via at least one processor, and
wherein the storage unit is implemented via at least one non-transitory computer-readable storage medium.

2. The decorative apparatus according to claim 1, further comprising:
at least one sensor,
wherein the drive control unit controls the display pattern on the thin-plate display according to an output value from the at least one sensor.

3. The decorative apparatus according to claim 2,
wherein the drive control unit is further configured to switch a display decoration of the display pattern according to the output value from the at least one sensor.

4. The decorative apparatus according to claim 2,
wherein the drive control unit is further configured to switch a display color of the display pattern according to the output value from the at least one sensor.

5. The decorative apparatus according to claim 2,
wherein the at least one sensor is any of an acceleration sensor, an illuminance sensor, a heartbeat sensor, a GPS sensor, an altitude sensor, an atmospheric pressure sensor, a human sensor, and a geomagnetic sensor.

6. The decorative apparatus according to claim 1, further comprising:
a switch configured to accept a switching operation by a user,
wherein the drive control unit controls the display pattern on the thin-plate display according to the switching operation accepted by the switch.

7. The decorative apparatus according to claim 6,
wherein the drive control unit is further configured to switch a display decoration of the display pattern in response to the switching operation.

8. The decorative apparatus according to claim 6,
herein the drive control unit is further configured to switch a display color of the display pattern in response to the switching operation.

9. The decorative apparatus according to claim 1,
wherein the drive control unit is further configured to change the display pattern on the thin-plate display at regular time intervals.

10. The decorative apparatus according to claim 1,
wherein the short-distance wireless communication unit is further configured to receive control information from the other apparatus using the short-distance wireless communication, and
wherein the drive control unit controls the display pattern on the thin-plate display according to the control information received from the other apparatus by the short-distance wireless communication.

11. The decorative apparatus according to claim 10,
wherein the short-distance wireless communication unit is further configured to receive information indicating contents that the other apparatus wishes to notify the user, and
wherein the drive control unit is further configured to change the display pattern on the thin-plate display according to the contents that the other apparatus wishes to notify the user.

12. The decorative apparatus according to claim 10,
wherein the short-distance wireless communication unit is further configured to receive an output value of a sensor of the other apparatus, and
wherein the drive control unit controls the display pattern on the thin-plate display according to the output value of the sensor of the other apparatus.

13. The decorative apparatus according to claim 1,
wherein the storage unit is further configured to store shape information that includes information regarding the shape of the stone, and
wherein the short-distance wireless communication unit is further configured to
transmit the shape information to the other apparatus, and receive the design data subjected to the correction process
based on the shape information.

14. The decorative apparatus according to claim 1,
wherein a 50/50 beam splitter is provided between the stone and the thin-plate display.

15. The decorative apparatus according to claim 14,
wherein the 50/50 beam splitter is arranged in an entire planar region between the stone and the thin-plate display.

16. The decorative apparatus according to claim 1,
wherein a mirror is provided in a part of a planar region between the stone and the thin-plate display.

17. A drive control method for a decorative apparatus, the decorative apparatus comprising:
   a thin-plate display arranged between a stone and a stone seat;
   a short-distance wireless communication unit configured to receive design data from another apparatus using short-distance wireless communication;
   a storage unit configured to store correction information for correcting the design data according to a shape of the stone; and
   a drive control unit configured to drive the thin-plate display,
wherein the drive control method comprises the drive control unit driving the thin-plate display by controlling a display pattern on the thin-plate display based on the received design data subjected to a correction process based on the stored correction information,
wherein the thin-plate display is configured to be flexibly deformed,
wherein the short-distance wireless communication unit and the drive control unit are each implemented via at least one processor, and
wherein the storage unit is implemented via at least one non-transitory computer-readable storage medium.

18. A communication system comprising:
a decorative apparatus; and
a terminal apparatus,
wherein the decorative apparatus includes:
   a thin-plate display arranged between a stone and a stone seat;
   a drive control unit configured to control a display pattern on the thin-plate display;
   a storage unit configured to store correction information for correcting the design data according to a shape of the stone; and
   a communication unit configured to perform wireless communication with the terminal apparatus, and
wherein the terminal apparatus is configured to transmit correction information for correcting the design data according to a shape of the stone and control information for changing the display pattern on the thin-plate display to the communication unit,
wherein the drive control unit controls the display pattern based on the stored correction information,
wherein the thin-plate display is configured to be flexibly deformed,
wherein the drive control unit and the communication unit are each implemented via at least one processor, and
wherein the storage unit is implemented via at least one non-transitory computer-readable storage medium.

* * * * *